United States Patent
Gatti-Lafranconi et al.

(10) Patent No.: US 12,529,098 B2
(45) Date of Patent: Jan. 20, 2026

(54) PRIMER OLIGONUCLEOTIDE FOR SEQUENCING

(71) Applicant: Illumina Cambridge Limited, Cambridge (GB)

(72) Inventors: Pietro Gatti-Lafranconi, Cambridge (GB); Philip Balding, Cambridge (GB); Jonathan Mark Boutell, Cambridge (GB)

(73) Assignee: Illumina Cambridge Limited, Cambridge (GB)

( * ) Notice: Subject to any disclaimer, the term of this patent is extended or adjusted under 35 U.S.C. 154(b) by 234 days.

(21) Appl. No.: 16/715,701

(22) Filed: Dec. 16, 2019

(65) Prior Publication Data

US 2020/0199666 A1 Jun. 25, 2020

Related U.S. Application Data

(60) Provisional application No. 62/780,570, filed on Dec. 17, 2018.

(51) Int. Cl.
*C12Q 1/68* (2018.01)
*C12Q 1/6813* (2018.01)
*C12Q 1/6869* (2018.01)

(52) U.S. Cl.
CPC .......... *C12Q 1/6869* (2013.01); *C12Q 1/6813* (2013.01); *C12Q 2600/156* (2013.01)

(58) Field of Classification Search
None
See application file for complete search history.

(56) References Cited

U.S. PATENT DOCUMENTS

| | | | |
|---|---|---|---|
| 8,263,336 B2 * | 9/2012 | Rothberg | G01N 27/4145 257/253 |
| 9,605,308 B2 | 3/2017 | Schultz et al. | |
| 10,227,647 B2 | 3/2019 | Ke et al. | |
| 10,329,615 B2 | 6/2019 | Bishop | |
| 10,544,456 B2 * | 1/2020 | Esfandyarpour | C12Q 1/6869 |
| 11,319,588 B2 | 5/2022 | Ke et al. | |
| 2009/0088327 A1 | 4/2009 | Rigatti et al. | |

(Continued)

FOREIGN PATENT DOCUMENTS

| JP | 2002360247 A | 12/2002 |
|---|---|---|
| JP | 2014503207 A | 2/2014 |

(Continued)

OTHER PUBLICATIONS

Petersen et al. (Trends in Biotech, 2003. 21(2):74-81) (Year: 2003).*

(Continued)

*Primary Examiner* — Stephanie K Mummert
(74) *Attorney, Agent, or Firm* — Mueting Raasch Group

(57) ABSTRACT

Polynucleotide sequencing methods employ a sequencing oligonucleotide that hybridizes to a free 3' end potion of a template polynucleotide strand with greater affinity than a surface oligonucleotide. Such sequencing oligonucleotides may be used as a primer to determine the sequence of an index sequence by extending the sequencing oligonucleotide using the template strand as a template. Sequencing processes that employ such sequencing oligonucleotides provide a sufficiently intense signal to determine to the sequence of the index sequence.

18 Claims, 10 Drawing Sheets

Specification includes a Sequence Listing.

(56) References Cited

U.S. PATENT DOCUMENTS

| | | |
|---|---|---|
| 2012/0156728 A1 | 6/2012 | Li et al. |
| 2012/0157322 A1 | 6/2012 | Myllykangas et al. |
| 2012/0157333 A1* | 6/2012 | Kauppinen ............ C07H 19/16 536/24.5 |
| 2014/0349891 A1 | 11/2014 | Liu et al. |
| 2015/0197799 A1 | 7/2015 | Rigatti et al. |
| 2016/0237488 A1* | 8/2016 | Ke ........................ C12Q 1/6806 |
| 2018/0142281 A1 | 5/2018 | Boutell et al. |
| 2020/0199666 A1* | 6/2020 | Gatti-Lafranconi ........................ C12Q 1/6869 |
| 2021/0261929 A1* | 8/2021 | Li ........................ C12N 9/1252 |
| 2022/0290230 A1 | 9/2022 | Ke et al. |

FOREIGN PATENT DOCUMENTS

| | | |
|---|---|---|
| JP | 2018508235 A | 3/2018 |
| JP | 2018516074 A | 6/2018 |
| WO | 2007010251 A2 | 1/2007 |
| WO | 2008041002 A2 | 4/2008 |
| WO | 2012025250 A1 | 3/2012 |
| WO | 2007078457 A2 | 7/2017 |
| WO | 2017117235 A1 | 7/2017 |
| WO | 2021173666 A1 | 9/2021 |
| WO | 2021180733 A1 | 9/2021 |

OTHER PUBLICATIONS

Vester et al. (Biochem, 2004, 43(42):13233-13241) (Year: 2004).*
U.S. Appl. No. 63/412,241, filed Sep. 30, 2022, 78 pages.
Fu et al., "Sequencing double-stranded DNA by strand displacement," Feb. 1, 1997, *Nucleic Acids Research*, 25(3):677-79.
International Patent Application No. PCT/EP2022/087978, filed Dec. 28, 2022; International Search Report & Written Opinion issued Apr. 18, 2023; 14 pages.

* cited by examiner

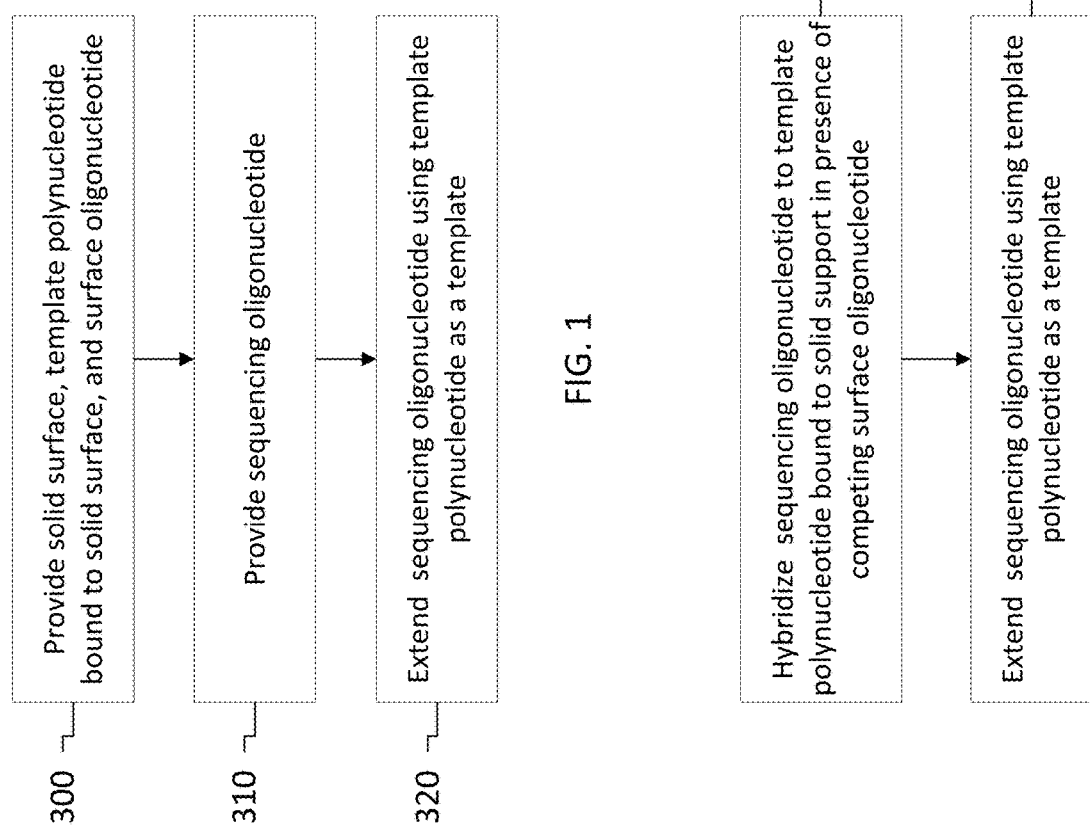

PRIMER OLIGONUCLEOTIDE FOR SEQUENCING

PRIORITY

This application claims the benefit of U.S. Provisional Application No. 62/780,570, filed Dec. 17, 2018, the disclosure of which is incorporated by reference herein in its entirety.

SEQUENCE LISTING

This application contains a Sequence Listing electronically submitted via EFS-Web to the United States Patent and Trademark Office as an ASCII text file entitled "1756US01_ST25.txt" having a size of 3.30 kilobytes and created on Feb. 12, 2020. The information contained in the Sequence Listing is incorporated by reference herein.

FIELD

The present disclosure relates to, among other things, sequencing of polynucleotides.

INTRODUCTION

Improvements in next-generation sequencing (NGS) technology have greatly increased sequencing speed and data output, resulting in the massive sample throughput of current sequencing platforms. One aspect of realizing this increased capacity is multiplexing, which adds unique sequences, called indexes, to each polynucleotide fragment to be sequenced during library preparation. This allows large numbers of libraries to be pooled and sequenced simultaneously during a single sequencing run. Gains in throughput from multiplexing come with an added layer of complexity, as sequencing reads from pooled libraries need to be identified and sorted computationally in a process called demultiplexing before final data analysis.

Library-specific index sequences may be added to polynucleotide fragments of each library so that the origin of each sequenced polynucleotide fragment may be properly identified. In some instances, more than one index sequence may be added to a given polynucleotide fragment to increase the power of information provided by the index sequences. For example, a first index sequence may be added in proximity to a 5' end of a polynucleotide strand comprising the fragment and a second index sequence may be added in proximity to a 3' end of the polynucleotide strand comprising the fragment. The index sequences may be added to polynucleotide fragments of a library by, for example, ligating adapters comprising the index sequences to ends of the polynucleotide fragments to be sequenced.

The adapters may contain sequences in addition to the index sequences, such as a universal extension primer sequence and a universal sequencing primer sequence. The universal extension primer sequence may, among other things, hybridize to a first oligonucleotide coupled to a solid surface. The first oligonucleotide may have a free 3' end from which a polymerase may add nucleotides to extend the sequence using the hybridized library polynucleotide as a template, resulting in a reverse strand of the library polynucleotide being coupled to the solid surface. Additional copies of forward and reverse strands may be coupled to the solid surface through cluster amplification. One example of cluster amplification is bridge amplification in which the 3' end of previously amplified polynucleotides that are bound to the solid surface hybridize to second oligonucleotides bound to the solid surface. The second oligonucleotide may have a free 3' end from which a polymerase may add nucleotides to extend the sequence using the coupled reverse strand polynucleotide as a template, resulting in a forward strand of the library polynucleotide being coupled to the solid surface via the second oligonucleotide. The process may be repeated to produce clusters of forward and reverse strands coupled to the solid surface. The forward strands or the reverse strands may be removed, e.g. via cleavage, prior to sequencing.

A sequencing primer may hybridize to a portion of a polynucleotide strand coupled to the solid support (referred to as the "template strand"). For example, the sequencing primer may hybridize to a universal sequencing primer sequence of the template strand, if present. Sequencing may occur through multiple rounds of addition of nucleotides to the sequencing primer using the template strand as a template and detecting the identity of the added nucleotides. Hybridization of the sequencing primer may occur at a location on the template strand to allow sequence identification of the index sequence as well as a target sequence of the template strand or separate sequencing primers may be employed to separately sequence the index sequences and the target sequences. Accordingly, the target sequence may be indexed to a particular library of origin based on the index sequence associated with the target sequence.

In some instances, the target sequence may be longer than the number of cycles of sequencing that may be reliably performed. In such instances, the free 3' end of the polynucleotide strand coupled to the solid support may be hybridized with a surface oligonucleotide having a free 3'end, the surface oligonucleotide may be extended by adding nucleotides, using the polynucleotide strand coupled to the solid support as a template, to form a copy strand in a process referred to as a "paired end turn." The template strand may be cleaved from the solid surface and washed away, leaving the copy strand bound to the solid surface. A second sequencing read of the target sequence may be performed on the copy strand to obtain sequence information from the opposite end of the target sequence relative to the first sequencing read.

If the template strand comprises a first index sequence 5' to the target sequence and a second index sequence 3' to the target sequence, the second index sequence is typically sequenced after the paired end turn or prior to the paired end turn using the surface primer employed in the paired end turn. Both instances have drawbacks. For example, reading the second index sequence from a primer bound to a solid surface tends to result in higher noise than reading a sequence from free primers. Reading an index sequence after the paired end turn does not allow for efficient demultiplexing in cases where the second read is not needed or desired.

SUMMARY

Attempts to use a free primer comprising a sequence identical to the surface primer used in the paired end turn to sequence the first index primer were unsuccessful. As described herein, such free primers did not result in a signal of sufficient intensity to reliably determine the second index sequence. While not intended to be bound by theory, it is believed that the surface primer sufficiently competes with the free primer for hybridization 3' end of the template strand to render the signal obtained during sequencing of the second index using the free primer inadequate.

The present disclosure describes, among other things, polynucleotide sequencing methods that employ a sequencing oligonucleotide that hybridizes to the free 3' end potion of a template polynucleotide strand with greater affinity than the surface oligonucleotide. Such sequencing oligonucleotides may be used as a primer to determine the sequence of the second index sequence by extending the sequencing oligonucleotide using the template strand as a template. Sequencing processes that employ such sequencing oligonucleotides provide a sufficiently intense signal to determine to the sequence of the second index sequence.

Because the sequencing oligonucleotide is a free primer (not bound to the solid surface), it does not tend to suffer from the issues of noise related to sequencing from a primer attached to the solid surface. In addition, the sequence of the second index may be obtained prior to the paired end turn, allowing for more efficient sequencing when the second read (following the paired end turn) is not needed or desired.

In some embodiments described herein, a method comprises: (i) providing a solid surface, a surface oligonucleotide bound to the solid surface and having a free 3' end, and a template polynucleotide bound to the solid surface and having a free 3' end, wherein at least a portion of the free 3' end of the template polynucleotide is configured to hybridize to at least a portion of the surface oligonucleotide such that a copy polynucleotide may be synthesized by extending the surface oligonucleotide using the template polynucleotide as a template; (ii) providing a sequencing oligonucleotide, wherein the sequencing oligonucleotide hybridizes to the at least the portion of the free 3' end of the template polynucleotide with greater affinity than the surface oligonucleotide; and (iii) extending the sequencing oligonucleotide using the template polynucleotide as a template.

Extending the sequencing oligonucleotide may be a step in a process for sequencing a portion of the template polynucleotide. The sequence of a second index may be obtained during the sequencing process.

The sequencing process may further comprise hybridizing an index primer to the template polynucleotide and extending the index primer using the template polynucleotide as a template to sequence a first index sequence of the template polynucleotide. The first and second index sequences are preferably different. Hybridizing the index primer to the template polynucleotide and extending the index primer to sequence the first index sequence may occur prior to sequencing the second index sequence.

The sequencing process may further comprise hybridizing a first read primer to the template polynucleotide and extending the first read primer using the template polynucleotide as a template to sequence a first read sequence of the template polynucleotide. Hybridizing the first read primer to the template polynucleotide and extending the first read primer to sequence the first read sequence may occur after sequencing the first index sequence. Hybridizing the first read primer to the template polynucleotide and extending the first read primer to sequence the first read sequence may occur after sequencing the first index sequence and the second index sequence.

The sequencing process may further comprise synthesizing the copy polynucleotide by extending the surface oligonucleotide using the template polynucleotide as a template. Synthesizing the copy polynucleotide by extending the surface polynucleotide may occur after sequencing the first index sequence, the second index sequence, and the first read sequence. The sequencing process may further comprise hybridizing a second read primer to the copy polynucleotide and extending the second read primer using the copy polynucleotide as a template to sequence a second read sequence of the copy polynucleotide.

The nucleotide sequence of the surface oligonucleotide may be the same as at least a portion of the sequencing oligonucleotide. The sequencing oligonucleotide may comprise a modified nucleotide that enhances base pair binding, relative to a natural nucleotide, to a nucleotide of the template polynucleotide. The modified nucleotide may be a locked nucleotide or a bridged nucleotide. The sequencing oligonucleotide may comprise a plurality of modified nucleotides that enhance base pair binding, relative to natural nucleotides, to nucleotides of the template polynucleotide. For example, 10% or more of the nucleotides of the sequencing oligonucleotide may be modified nucleotides. In some embodiments, 50% or less of the nucleotides of the sequencing oligonucleotide may be modified nucleotides. The modified nucleotides may be comprised in the portion of the sequencing oligonucleotide having the same sequence as the surface nucleotide.

The details of one or more embodiments are set forth in the accompanying drawings and the description below. Other features, objects, and advantages will be apparent from the description and drawings, and from the claims.

It is to be understood that both the foregoing general description and the following detailed description present embodiments of the subject matter of the present disclosure and are intended to provide an overview or framework for understanding the nature and character of the subject matter of the present disclosure as it is claimed. The accompanying drawings are included to provide a further understanding of the subject matter of the present disclosure and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative and are not intended to limit the scope of the claims in any manner.

DESCRIPTION OF DRAWINGS

The following detailed description of specific embodiments of the present disclosure may be best understood when read in conjunction with the following drawings.

FIGS. 1 and 2 are flow diagrams illustrating overviews of embodiments of methods described herein.

Figure 3:
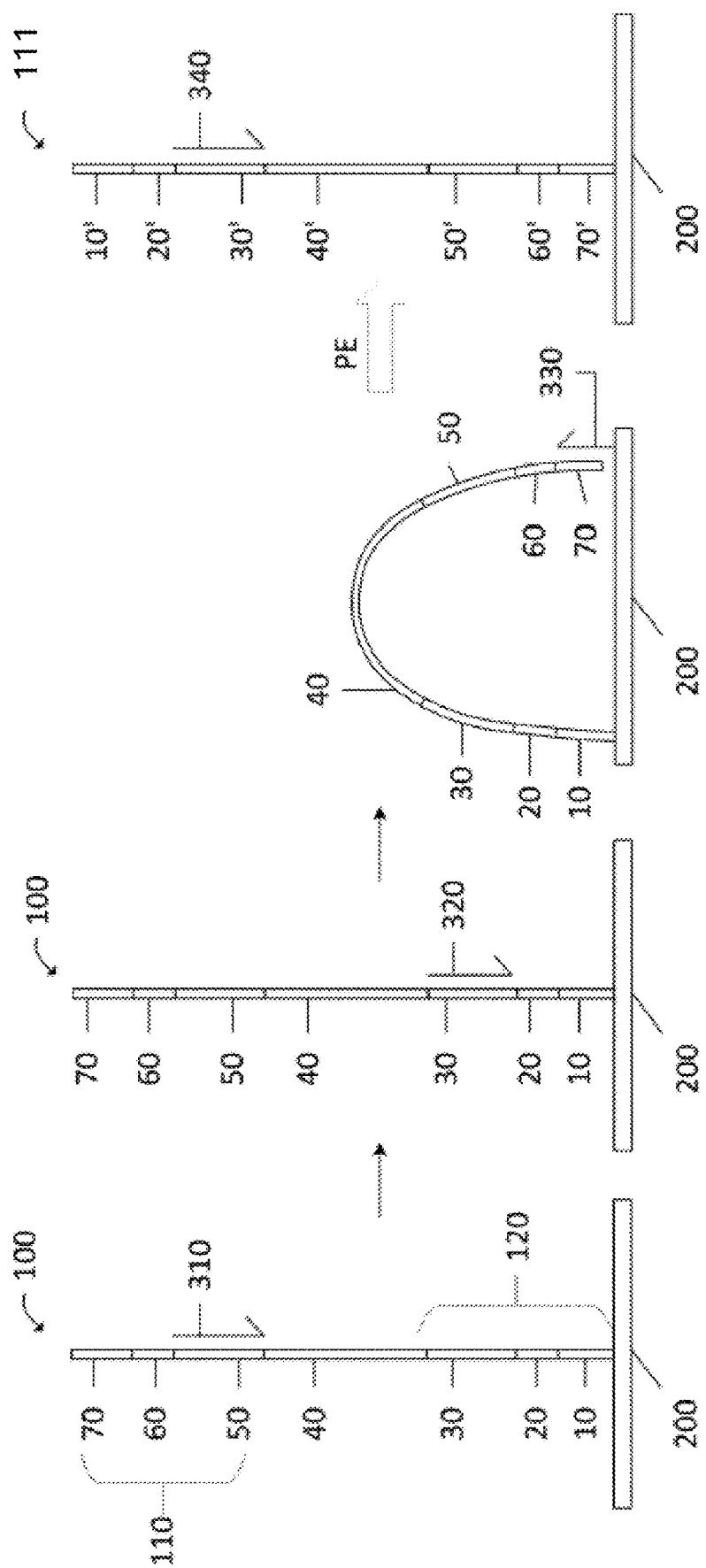
FIGS. 3 and 4 are schematic drawings illustrating existing sequencing workflows.

The schematic drawings are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar to other numbered components.

DETAILED DESCRIPTION

Reference will now be made in greater detail to various embodiments of the subject matter of the present disclosure, some embodiments of which are illustrated in the accompanying drawings.

All scientific and technical terms used herein have meanings commonly used in the art unless otherwise specified. The definitions provided herein are to facilitate understanding of certain terms used frequently herein and are not meant to limit the scope of the present disclosure.

As used herein, singular forms "a," "an" and "the" include plural referents unless the context clearly dictates otherwise. Thus, for example, reference to a "template polynucleotide sequence" includes examples having two or more such "template polynucleotide sequences" unless the context clearly indicates otherwise.

As used in this specification and the appended claims, the term "or" is generally employed in its sense including "and/or" unless the content clearly dictates otherwise. The term "and/or" means one or all of the listed elements or a combination of any two or more of the listed elements. The use of "and/or" in some instances does not imply that the use of "or" in other instances may not mean "and/or."

As used herein, "have", "has", "having", "include", "includes", "including", "comprise", "comprises", "comprising" or the like are used in their open-ended inclusive sense, and generally mean "include, but not limited to", "includes, but not limited to", or "including, but not limited to".

"Optional" or "optionally" means that the subsequently described event, circumstance, or component, can or cannot occur, and that the description includes instances where the event, circumstance, or component, occurs and instances where it does not.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the inventive technology.

In addition, the recitations herein of numerical ranges by endpoints include all numbers subsumed within that range (e.g., 1 to 5 includes 1, 1.5, 2, 2.75, 3, 3.80, 4, 5, etc.). Where a range of values is "greater than", "less than", etc. a particular value, that value is included within the range.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. However, it will be understood that a presented order is one embodiment of an order by which the method may carried out. Any recited single or multiple feature or aspect in any one claim may be combined or permuted with any other recited feature or aspect in any other claim or claims.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising an incorporation step, a detection step, a deprotection step, and one or more wash steps includes embodiments where the method consists of enumerated steps and embodiments where the method consists essentially of the enumerated.

As used herein, "providing" in the context of a compound, composition, or article means making the compound, composition, or article, purchasing the compound, composition or article, or otherwise obtaining the compound, composition or article.

As used herein, the term "chain extending enzyme" is an enzyme that produces a copy replicate of a polynucleotide using the polynucleotide as a template strand. For example, the chain extending enzyme may be an enzyme having polymerase activity. Typically, DNA polymerases bind to the template strand and then move down the template strand sequentially adding nucleotides to the free hydroxyl group at the 3' end of a growing strand of nucleic acid. DNA polymerases typically synthesize complementary DNA molecules from DNA templates and RNA polymerases typically synthesize RNA molecules from DNA templates (transcription). Polymerases may use a short RNA or DNA strand, called a primer, to begin strand growth. Some polymerases may displace the strand upstream of the site where they are adding bases to a chain. Such polymerases are said to be strand displacing, meaning they have an activity that removes a complementary strand from a template strand being read by the polymerase. Exemplary polymerases having strand displacing activity include, without limitation, the large fragment of Bst (*Bacillus stearothermophilus*) polymerase, exo-Klenow polymerase or sequencing grade T7 exo-polymerase. Some polymerases degrade the strand in front of them, effectively replacing it with the growing chain behind (5' exonuclease activity). Some polymerases have an activity that degrades the strand behind them (3' exonuclease activity). Some useful polymerases have been modified, either by mutation or otherwise, to reduce or eliminate 3' and/or 5' exonuclease activity.

As used herein, the term "primer" and its derivatives refer generally to any polynucleotide that may hybridize to a target sequence of interest. Typically, the primer functions as a substrate onto which nucleotides may be polymerized by a polymerase; in some embodiments, however, the primer may become incorporated into the synthesized polynucleotide strand and provide a site to which another primer may hybridize to prime synthesis of a new strand that is complementary to the synthesized nucleic acid molecule. The primer may be comprised of any combination of nucleotides or analogs thereof. In some embodiments, the primer is a single-stranded oligonucleotide or polynucleotide.

The terms "polynucleotide" and "oligonucleotide" are used interchangeably herein to refer to a polymeric form of nucleotides of any length, and may comprise ribonucleotides, deoxyribonucleotides, analogs thereof, or mixtures thereof. This term refers only to the primary structure of the molecule. Thus, the term includes triple-, double- and single-stranded deoxyribonucleic acid ("DNA"), as well as triple-, double- and single-stranded ribonucleic acid ("RNA"). As used herein, "amplified target sequences" and its derivatives, refers generally to a polynucleotide sequence produced by the amplifying the target sequences using target-specific primers and the methods provided herein. The amplified target sequences may be either of the same sense (i.e the positive strand) or antisense (i.e., the negative strand) with respect to the target sequences.

Suitable nucleotides for use in the provided methods include, but are not limited to, deoxynucleotide triphosphates, deoxyadenosine triphosphate (dATP), deoxythymidine triphosphate (dTTP), deoxycytidine triphosphate (dCTP), and deoxyguanosine triphosphate (dGTP). Optionally, the nucleotides used in the provided methods, whether labeled or unlabeled, can include a blocking moiety such as a reversible terminator moiety that inhibits chain extension. Suitable labels for use on the labeled nucleotides include, but are not limited to, haptens, radionucleotides, enzymes, fluorescent labels, chemiluminescent labels, and chromogenic agents.

A polynucleotide will generally contain phosphodiester bonds, although in some cases nucleic acid analogs can have alternate backbones, comprising, for example, phosphoramide (Beaucage et al., Tetrahedron 49(10): 1925 (1993) and references therein; Letsinger, J. Org. Chem. 35:3800 (1970); Sprinzl et al., Eur. J. Biochem. 81:579 (1977); Letsinger et al., Nucl. Acids Res. 14:3487 (1986); Sawai et al, Chem. Lett. 805 (1984), Letsinger et al., J. Am. Chem. Soc. 110:4470 (1988); and Pauwels et al., Chemica Scripta 26:141 91986)), phosphorothioate (Mag et al., Nucleic Acids Res. 19:1437 (1991); and U.S. Pat. No. 5,644,048), phosphorodithioate (Briu et al., J. Am. Chem. Soc. 111:2321 (1989), O-methylphophoroamidite linkages (see Eckstein, Oligonucleotides and Analogues: A Practical Approach, Oxford University Press), and peptide nucleic acid backbones and linkages (see Egholm, J. Am. Chem. Soc. 114: 1895 (1992); Meier et al., Chem. Int. Ed. Other analog nucleic acids include those with positive backbones (Denpcy et al., Proc. Natl. Acad. Sci. USA 92:6097 (1995); non-ionic backbones (U.S. Pat. Nos. 5,386,023, 5,637,684, 5,602,240, 5,216,141 and 4,469,863; Kiedrowski et al., Angew. Chem. Intl. Ed. English 30:423 (1991); Letsinger et al., J. Am. Chem. Soc. 110:4470 (1988); Letsinger et al., Nucleoside & Nucleotide 13:1597 (1994); Chapters 2 and 3, ASC Symposium Series 580, "Carbohydrate Modifications in Antisense Research", Ed. Y. S. Sanghui and P. Dan Cook; Mesmaeker et al., Bioorganic & Medicinal Chem. Lett. 4:395 (1994); Jeffs et al., J. Biomolecular NMR 34:17 (1994); Tetrahedron Lett. 37:743 (1996)) and non-ribose backbones, including those described in U.S. Pat. Nos. 5,235,033 and 5,034,506, and Chapters 6 and 7, ASC Symposium Series 580, "Carbohydrate Modifications in Antisense Research", Ed. Y. S. Sanghui and P. Dan Cook. Polynucleotides containing one or more carbocyclic sugars are also included within the definition of polynucleotides (see Jenkins et al., Chem. Soc. Rev. (1995) pp 169-176). Several polynucleotide analogs are described in Rawls, C & E News Jun. 2, 1997 page 35. All these references are hereby expressly incorporated by reference. These modifications of the ribose-phosphate backbone may be done to facilitate the addition of labels, or to increase the stability and half-life of such molecules in physiological environments.

A polynucleotide will generally contain a specific sequence of four nucleotide bases: adenine (A); cytosine (C); guanine (G); and thymine (T). Uracil (U) can also be present, for example, as a natural replacement for thymine when the nucleic acid is RNA. Uracil can also be used in DNA. A polynucleotide may also include native or non-native bases. In this regard, a native deoxyribonucleic acid polynucleotide may have one or more bases selected from the group consisting of adenine, thymine, cytosine or guanine and a ribonucleic acid may have one or more bases selected from the group consisting of uracil, adenine, cytosine or guanine. It will be understood that a deoxyribonucleic acid polynucleotide used in the methods or compositions set forth herein may include, for example, uracil bases and a ribonucleic acid can include, for example, a thymine base. Exemplary non-native bases that may be included in a nucleic acid, whether having a native backbone or analog structure, include, without limitation, inosine, xathanine, hypoxathanine, isocytosine, isoguanine, 2-aminopurine, 5-methylcytosine, 5-hydroxymethyl cytosine, 2-aminoadenine, 6-methyl adenine, 6-methyl guanine, 2-propyl guanine, 2-propyl adenine, 2-thioLiracil, 2-thiothymine, 2-thiocytosine, 15-halouracil, 15-halocytosine, 5-propynyl uracil, 5-propynyl cytosine, 6-azo uracil, 6-azo cytosine, 6-azo thymine, 5-uracil, 4-thiouracil, 8-halo adenine or guanine, 8-amino adenine or guanine, 8-thiol adenine or guanine, 8-thioalkyl adenine or guanine, 8-hydroxyl adenine or guanine, 5-halo substituted uracil or cytosine, 7-methylguanine, 7-methyladenine, 8-azaguanine, 8-azaadenine, 7-deazaguanine, 7-deazaadenine, 3-deazaguanine, 3-deazaadenine or the like. Optionally, isocytosine and isoguanine may be included in a nucleic acid in order to reduce non-specific hybridization, as generally described in U.S. Pat. No. 5,681,702, which is incorporated by reference herein in its entirety.

A non-native base used in a polynucleotide may have universal base pairing activity such that it is capable of base pairing with any other naturally occurring base. Exemplary bases having universal base pairing activity include 3-nitropyrrole and 5-nitroindole. Other bases that can be used include those that have base pairing activity with a subset of the naturally occurring bases such as inosine, which basepairs with cytosine, adenine or uracil.

Incorporation of a nucleotide into a polynucleotide strand refers to joining of the nucleotide to a free 3' hydroxyl group of the polynucleotide strand via formation of a phosphodiester linkage with the 5' phosphate group of the nucleotide. The polynucleotide template to be sequenced can be DNA or RNA, or even a hybrid molecule that includes both deoxynucleotides and ribonucleotides. The polynucleotide can include naturally occurring and/or non-naturally occurring nucleotides and natural or non-natural backbone linkages.

Among other things, the present disclosure describes polynucleotide sequencing methods that employ a sequencing oligonucleotide that hybridizes to the free 3' end potion of a template polynucleotide strand with greater affinity than the surface oligonucleotide. Such sequencing oligonucleotides may be used as a primer to determine the sequence of the second index sequence by extending the sequencing oligonucleotide using the template strand as a template. Sequencing processes that employ such polynucleotides provide a sufficiently intense signal to determine to the sequence of the second index sequence.

Because the sequencing oligonucleotide is a free primer (not bound to the solid surface), it does not tend to suffer from the issues of noise related to sequencing from a primer attached to the solid surface. In addition, the sequence of the second index may be obtained prior to the paired end turn, allowing for more efficient sequencing when the second read (following the paired end turn) is not needed or desired.

FIG. 1 is a flow chart illustrating an overview of embodiment of a method employing the sequencing oligonucleotide. The method includes providing a solid surface, a surface oligonucleotide bound to the solid surface and having a free 3' end, and a template polynucleotide bound to the solid surface and having a free 3' end (300). At least a portion of the free 3' end of the template polynucleotide is configured to hybridize to at least a portion of the surface oligonucleotide such that a copy polynucleotide may be synthesized by extending the surface oligonucleotide using the template polynucleotide as a template. The method further comprises providing a sequencing oligonucleotide (310). The sequencing oligonucleotide hybridizes to the at least the portion of the free 3' end of the template polynucleotide with greater affinity than the surface oligonucleotide. The method also comprises extending the sequencing oligonucleotide using the template polynucleotide as a template (320). Extending the sequencing oligonucleotide (320) may be a step in a process for sequencing a portion of the template polynucleotide, such as a second index sequence.

FIG. 2 is also a flow chart illustrating an overview of embodiment of a method employing the sequencing oligonucleotide. The method includes hybridizing the sequencing oligonucleotide to a template polynucleotide, which is bound to a surface of a solid support to which a competing surface oligonucleotide is bound (350). The surface oligonucleotide and the sequencing oligonucleotide hybridize to the same sequence of the template polynucleotide and thus are considered competing. The sequencing oligonucleotide hybridizes to the template polynucleotide with greater affinity than the surface oligonucleotide. The method further comprises extending the sequencing oligonucleotide using the template polynucleotide as a template (360). Extending the sequencing oligonucleotide (360) may be a step in a process for sequencing a portion of the template polynucleotide, such as a second index sequence.

For purpose of illustration, aspects of sequencing methods that may be employed using a sequencing oligonucleotide are described below regarding FIG. 5. Prior to describing such aspects, sequencing workflows that are currently employed are presented in, and described regarding, FIGS. 3-4 to provide context for some of the advantages associated with the method depicted in, and described regarding, FIG. 5.

Referring to FIG. 3, an overview of a currently employed sequencing workflow is shown. In the depicted workflow, a template polynucleotide strand 100 is attached to a solid surface 200. The template polynucleotide strand 100 comprises a free 3' end and is attached to the solid surface 200 at a 5' end. The template polynucleotide strand 100 includes an insert 40, which may be of an unknown sequence, between a 3' adapter portion 110 and a 5' adapter portion 120. The sequences of the 3' and 5' adapter portions 110, 120 are known. The 3' adapter portion 110 includes a 3' end portion 70 configured to hybridize to at least a portion of a surface oligonucleotide 330 bound to solid surface 200 (shown in the third panel from the left). A copy polynucleotide strand 111 may be synthesized by extending the surface oligonucleotide 330 using the template polynucleotide strand 100 as a template in a paired end (PE) turn process.

The 3' adapter portion 110 of the template polynucleotide strand 100 further includes a second index sequence 60 and a first primer hybridization sequence 50. The 5' adapter portion 120 includes a 5' end portion 10, a first index sequence 20, and a second primer hybridization sequence 30.

In the workflow depicted in FIG. 3, a first read primer 310 is hybridized to the first primer hybridization sequence 50 of the template strand 100, and the sequence of at least a 3' portion of the insert 40 is determined, reading from the template strand in the 3' to the 5' direction as the first read primer 310 is extended in the 5' to 3' direction (extension not shown) in a number of sequencing cycles.

The extended first read primer is removed by denaturing, and a first index primer 320 is hybridized to the second primer hybridization sequence 30 of the template polynucleotide strand 100. The sequence of the first index sequence 20 is determined, reading from the template strand in the 3' to the 5' direction as the first index primer 320 is extended in the 5' to 3' direction (extension not shown) in a number of sequencing cycles.

The extended first index primer is removed by denaturing, and the 3' end portion 70 of the template strand 100 is hybridized to the bound surface oligonucleotide 330. Prior to hybridization, a blocking moiety may be removed from the 3' end of the surface oligonucleotide 330 to allow extension of the surface oligonucleotide 330 using the template strand 100 as a template. The sequence of the second index sequence 60 is determined by extending the surface oligonucleotide 330, reading from the template strand 100 in the 3' to the 5' direction as the surface oligonucleotide 330 is extended in the 5' to 3' direction (extension not shown) in a number of sequencing cycles.

Extension of the surface oligonucleotide may continue until a copy strand 111, which is a complement of the template strand 100 is produced in a paired-end (PE) turn process. Because the copy strand 111 is a complement of the template strand 100, the sequences of the copy strand 111 that correspond to the sequences of the template polynucleotide strand are shown with a prime (') in the right panel of FIG. 3.

The template strand 100 may be cleaved in proximity to the 5' end to release the template strand 100 from the solid surface 200. The released template strand may be washed away, leaving the copy strand 111 attached to the solid surface 200. A second read primer 340 may be hybridized to the complement of the second primer hybridization sequence 30', and the sequence of at least a 3' portion of the complement of the insert 40' (which corresponds to the 5' portion of the insert 40) is determined, reading from the copy strand 111 in the 3' to the 5' direction as the second read primer 340 is extended in the 5' to 3' direction (extension not shown) in a number of sequencing cycles.

The workflow depicted in FIG. 3 and described above has the benefit of determining both the first and second index sequences 20, 60 before the paired-end (PE) turn. Accordingly, if the second read (sequencing from the second read primer 340) is not needed or desired, information regarding both index sequences is efficiently obtained. However, the workflow depicted in FIG. 3 obtains the sequence of the first index sequence 20 from a primer (surface oligonucleotide 330) attached to the solid surface 200, which tends to result in higher noise and less reliability than sequences obtained using free primers that are not attached to the solid surface. At least in part, it is believed that the higher noise results from an excess of unblocked surface primers being on the surface of, for example, a flow cell. In addition to the desired incorporation onto the surface primers hybridized to the clusters strands, non-specific incorporation onto un-used surface primers occurs, especially in high primer density systems. This leads to a noisier sequencing read when sequencing from surface primers.

Figure 4:
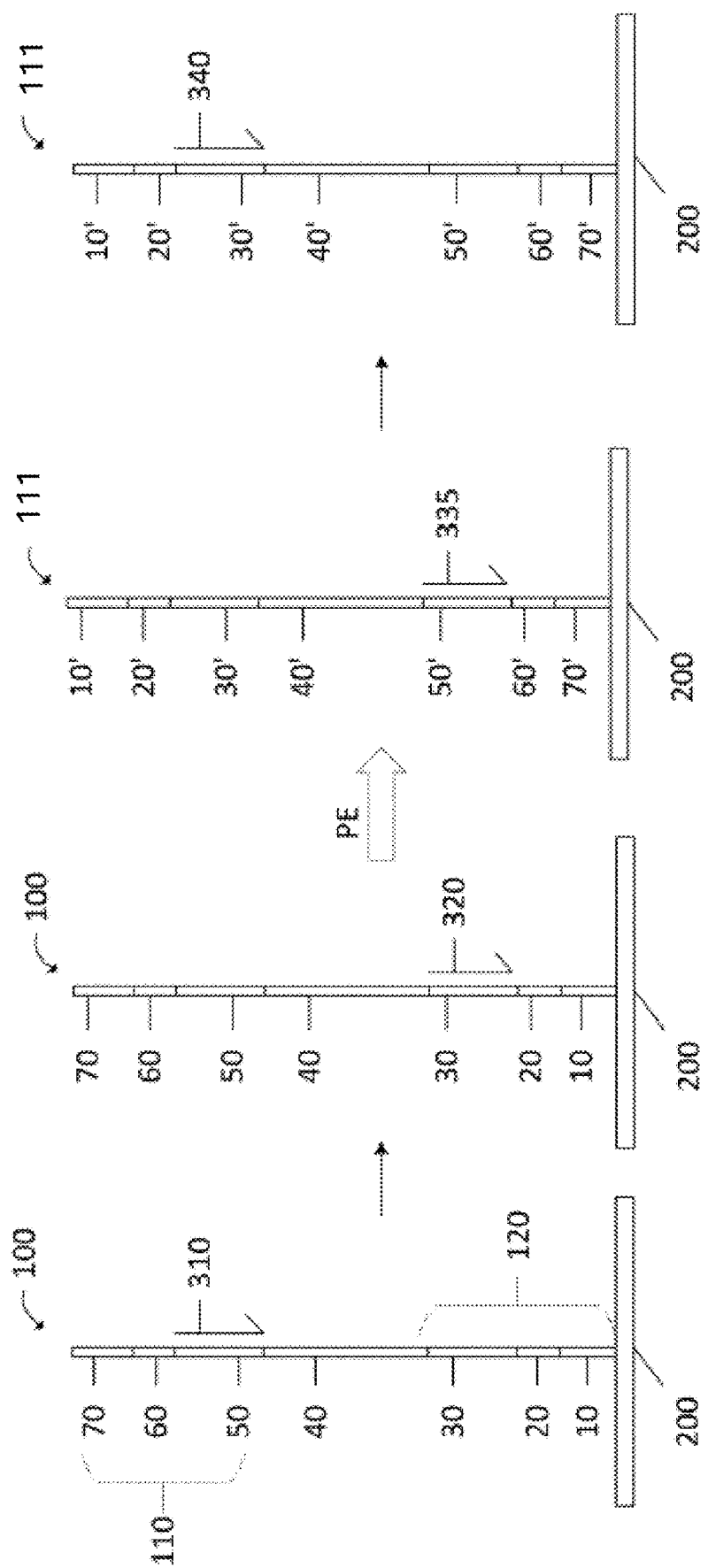

Referring to FIG. 4, an overview of another current sequencing workflow is shown. In the depicted workflow, a template polynucleotide strand 100 is attached to a solid surface 200. The template polynucleotide strand 100 comprises a free 3' end and is attached to the solid surface 200 at a 5' end. The template polynucleotide strand 100 includes an insert 40, which may be of an unknown sequence, between a 3' adapter portion 110 and a 5' adapter portion 120. The sequences of the 3' and 5' adapter portions 110, 120 are known. The 3' adapter portion 110 includes a 3' end portion 70 configured to hybridize to at least a portion of a surface oligonucleotide (not shown in FIG. 4 but refer to surface oligo nucleotide 330 in FIG. 3) bound to the solid surface 200. A copy polynucleotide strand 111 may be synthesized by extending the surface oligonucleotide using the template polynucleotide strand 100 as a template in a paired end (PE) turn process.

The 3' adapter portion 110 further includes a second index sequence 60 and a first primer hybridization sequence 50. The 5' adapter portion 120 includes a 5' end portion 10, a first index sequence 20, and a second primer hybridization sequence 30.

In the workflow depicted in FIG. 4, a first read primer 310 is hybridized to the first primer hybridization sequence 50 of the template strand 100, and the sequence of at least a 3' portion of the insert 40 is determined, reading from the template strand in the 3' to the 5' direction as the first read primer 310 is extended in the 5' to 3' direction (extension not shown) in a number of sequencing cycles.

The extended first read primer is removed by denaturing, and a first index primer 320 is hybridized to the second primer hybridization sequence 30 of the template polynucleotide strand 100. The sequence of the first index sequence 20 is determined, reading from the template strand in the 3' to the 5' direction as the first index primer 320 is extended in the 5' to 3' direction (extension not shown) in a number of sequencing cycles.

The extended first index primer is removed by denaturing, and the 3' end portion 70 of the template strand 100 is hybridized to the bound surface oligonucleotide (not shown in FIG. 4). Prior to hybridization, a blocking moiety may be removed from the 3' end of the surface oligonucleotide 330 to allow extension of the surface oligonucleotide 330 using the template strand 100 as a template. Extension of the surface oligonucleotide may continue until a copy strand 111, which is a complement of the template strand 100 is produced in a paired end (PE) turn process. Because the copy strand 111 is a complement of the template strand 100, the sequences of the copy strand 111 that correspond to the sequences of the template strand are shown with a prime (') in FIG. 4.

The template strand 100 may be cleaved in proximity to the 5' end to release the template strand 100 from the solid surface 200. The released template strand may be washed away, leaving the copy strand 111 attached to the solid surface 200. A second index primer 335 is hybridized to the complement of the first primer hybridization sequence 50', and the sequence of the complement of the second index sequence 60' is determined, reading from the copy strand in the 3' to the 5' direction as the second index primer 335 is extended in the 5' to 3' direction (extension not shown) in a number of sequencing cycles.

The extended second index primer is removed by denaturing, and a second read primer 340 may be hybridized to the complement of the second primer hybridization sequence 30'. The sequence of at least a 3' portion of the complement of the insert 40' (which corresponds to the 5' portion of the insert 40) is determined, reading from the copy strand in the 3' to the 5' direction as the first read primer 310 is extended in the 5' to 3' direction (extension not shown) in a number of sequencing cycles.

The workflow depicted in FIG. 4 and described above has the benefit of determining both the first and second index sequences 20, 60 from free primers (the first index primer 310 and the second index primer 335), which avoids issues associated with obtaining one of the index sequences from a primer bound to the solid surface as indicated above regarding the workflow depicted in FIG. 3. However, the workflow depicted in FIG. 4 obtains the first index sequence after the paired-end (PE) turn. In situations where the second read (sequencing from the second read primer 340) is not needed or desired, the paired end (PE) turn must be completed prior to obtaining the sequence of the second index which results in a relatively inefficient process.

Figure 5:
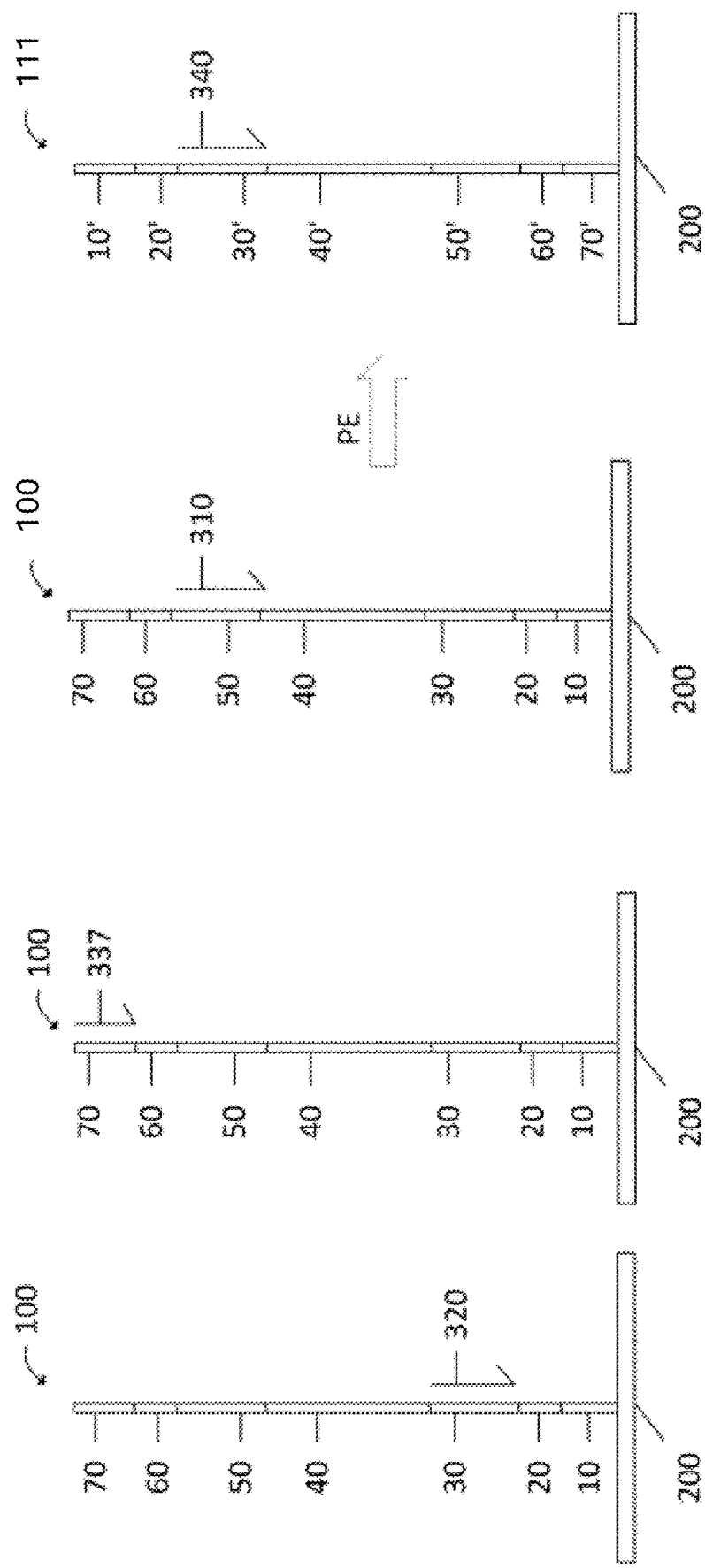
FIG. 5 is a schematic drawing illustrating an embodiment of a sequencing workflow employing a sequencing oligonucleotide.

Referring to FIG. 5, an overview of a sequencing workflow is shown that overcomes problems associated with the workflows depicted in FIG. 3 and FIG. 4. Specifically, the sequencing workflow depicted in FIG. 5 obtains both the first and second index sequences from free primers and prior to the paired end turn through the use of a modified second index primer 337 as described in more detail below.

Like with FIG. 3 and FIG. 4, FIG. 5 depicts a template polynucleotide strand 100 attached to a solid surface 200. The template polynucleotide strand 100 comprises a free 3' end and is attached to the solid surface 200 at a 5' end. The template polynucleotide strand 100 includes an insert 40, which may be of an unknown sequence, between a 3' adapter portion 110 and a 5' adapter portion 120. The sequences of the 3' and 5' adapter portions 110, 120 are known. The 3' adapter portion 110 includes a 3' end portion 70 configured to hybridize to at least a portion of a surface oligonucleotide (not shown in FIG. 5 but refer to surface oligo nucleotide 330 in FIG. 3) bound to the solid surface 200. A copy polynucleotide strand 111 may be synthesized by extending the surface oligonucleotide using the template polynucleotide strand 100 as a template in a paired-end (PE) turn process.

The 3' adapter portion 110 further includes a second index sequence 60 and a first primer hybridization sequence 50. The 5' adapter portion 120 includes a 5' end portion 10, a first index sequence 20, and a second primer hybridization sequence 30.

In the workflow depicted in FIG. 5, a first index primer 320 is hybridized to the second primer hybridization sequence 30 of the template polynucleotide strand 100. The sequence of the first index sequence 20 is determined, reading from the template strand 100 in the 3' to the 5' direction as the first index primer 320 is extended in the 5' to 3' direction (extension not shown) in a number of sequencing cycles.

The extended first index primer is removed by denaturing, and modified second index primer 337 is hybridized to the 3' end portion 70 of the template strand 100, and the sequence of the second index sequence 60 is determined, reading from the copy strand in the 3' to the 5' direction as the modified second index primer 337 is extended in the 5' to 3' direction (extension not shown) in a number of sequencing cycles.

The extended modified second index primer is removed by denaturing, and a first read primer 310 is hybridized to the first primer hybridization sequence 50. The sequence of at least a 3' portion of the insert 40 is determined, reading from the template strand in the 3' to the 5' direction as the first read primer 310 is extended in the 5' to 3' direction (extension not shown) in a number of sequencing cycles.

After the first index sequence 20, second index sequence 60, and at least a portion of the insert sequence 40 are determined, the copy strand 111 may be synthesized by hybridizing the 3' end portion 70 of the template strand 100 to a surface oligonucleotide (not shown in FIG. 5 but refer to surface oligo nucleotide 330 in FIG. 3) bound to the solid surface 200 and extending the surface oligonucleotide using the template polynucleotide strand 100 as a template in a paired-end PE) turn process.

A second read primer 340 may be hybridized to the complement of the second primer hybridization sequence 30' in the copy strand 111. The sequence of at least a 3' portion of the complement of the insert 40' (which corresponds to the 5' portion of the insert 40) may be determined, reading from the copy strand in the 3' to the 5' direction as the first read primer 310 is extended in the 5' to 3' direction (extension not shown) in a number of sequencing cycles.

While not shown in FIG. 5, hybridization of the modified index primer 337 to the 3' end portion 70 of the template strand 100 competes with hybridization of the 3' end portion 70 of the template strand 100 with the surface oligonucleotide (not shown in FIG. 5). The inventors have found that a free index primer that is the same sequence as the surface oligonucleotide and is not modified may not be effectively used to obtain the second index sequence 60. To effectively obtain the second index sequence 60 in a workflow process depicted in FIG. 5 and described above, the second index primer 337 is modified to have greater affinity for the 3' end portion 70 of the template strand 100 than the surface oligonucleotide.

Figure 6:
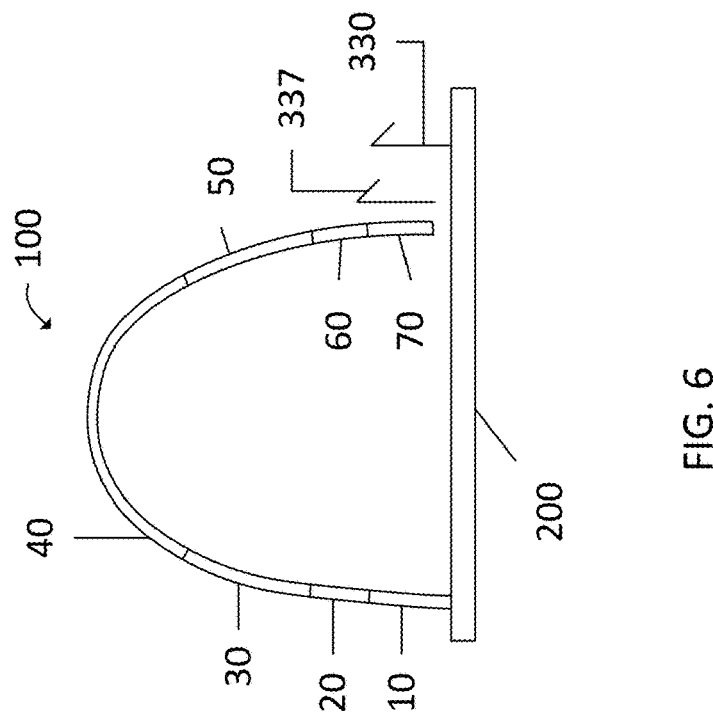
FIG. 6 is a schematic drawing illustrating interaction of a surface oligonucleotide, a sequencing oligonucleotide, and a 3' portion of a template polynucleotide strand.

For example, and with reference to FIG. 6, when the second index primer 337 is modified to have greater affinity for the 3' end portion 70 of the template strand 100 than the surface oligonucleotide 330, hybridization of the second index primer 337 to the 3' end portion 70 of the template strand 100 is favored. The second index primer 337 may be extended to read the sequence of the second index sequence 60. To the extent that the 3' ends of any template strands in a cluster (not shown) are hybridized to the surface oligonucleotide 337, the 3' end of the surface oligonucleotide 330 may be blocked to prevent extension from the surface oligonucleotide 330.

Figure 7B:
FIGS. 7A and 7B are schematic drawings illustrating interaction of a surface oligonucleotide, a sequencing oligonucleotide, and a 3' portion of a template polynucleotide strand. The surface oligonucleotide has a sequence of AATGATACGGCGACCACCGAGA (SEQ ID NO:1). The sequencing oligonucleotide has a sequence of AATGATACGGCGACCACCGAGATCTACAC (SEQ ID NO:2). The portion of the template polynucleotide strand shown has a sequence of NNNNNNNNGTGTA-GATCTCGGTGGTCGCCGTATCATT (SEQ ID NO: 3).
Figure 7A:
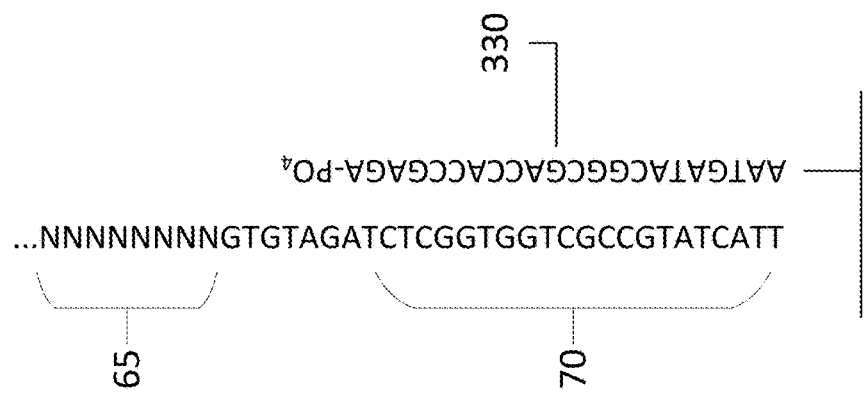

FIGS. 7A-B illustrate interaction of a surface oligonucleotide 330, a 3' end portion 70 of a template strand, and a free sequencing oligonucleotide 337, which may be an index primer. The 3' end of the surface oligonucleotide 330 is blocked. The block may be removed prior to paired end turn synthesis of a copy strand.

The sequencing oligonucleotide 337 has greater affinity for the 3' end portion 70 of the template strand than the surface oligonucleotide 330. Accordingly, when the sequencing oligonucleotide 337 is present under hybridization conditions, the 3' end portion 70 of the template strand preferentially hybridizes to the sequencing oligonucleotide 337. Sequencing of the template strand, e.g. sequence 65, which may be an index sequence, may occur by extending the sequencing oligonucleotide 337 in the 3' direction during cycles of sequencing using the template strand as a template.

The sequencing oligonucleotide 337 may be modified in any suitable manner to increase affinity for the 3' end portion 70 of the template strand. For example, the sequencing oligonucleotide may comprise a modified nucleotide that enhances base pair binding, relative to a natural nucleotide, to a nucleotide of the template polynucleotide. Such modified nucleotides are known and include, for example, locked nucleotides (LNAs) and bridged nucleotides (BNAs).

LNAs and BNAs may be incorporated into oligonucleotides at desired positions by chemically synthesizing the oligonucleotides, such as through standard phosphoamidite chemistry. LNAs and BNAs, as well as oligonucleotides containing LNAs and BNAs, are commercially available.

BNAs are modified RNA nucleotides that are sometimes referred to as constrained or inaccessible RNA molecules. BNA monomers may contain a five-, six-membered, or seven-membered bridged structure incorporated at the 2',4'-position of the ribose. BNAs are structurally rigid oligonucleotides with increased binding affinities for hybridizing to complementary bases. The following publications provide additional information regarding BNAs: (1) Obika, S., et al., (1997), "Synthesis of 2'-O,4'-C-methyleneuridine and -cytidine. Novel bicyclic nucleosides having a fixed C3, -endo sugar puckering," Tetrahedron Letters. 38 (50): 8735; (2) Obika, S., et al., (2001), "3'-amino-2',4'-BNA: Novel bridged nucleic acids having an N3'-->P5' phosphoramidate linkage," Chemical communications (Cambridge, England) (19): 1992-1993; (3) Obika, S., et al., (2001), "A 2',4'-Bridged Nucleic Acid Containing 2-Pyridone as a Nucleobase: Efficient Recognition of a C•G Interruption by Triplex Formation with a Pyrimidine Motif," Angewandte Chemie International Edition. 40 (11): 2079; (4) Morita, K., et al., (2001), "2'-O,4'-C-ethylene-bridged nucleic acids (ENA) with nuclease-resistance and high affinity for RNA," Nucleic Acids Research. Supplement. 1 (1): 241-242; (5) Hari, Y., et al., (2003), "Selective recognition of CG interruption by 2',4'-BNA having 1-isoquinolone as a nucleobase in a pyrimidine motif triplex formation," Tetrahedron. 59 (27): 5123; (6) Rahman, S. M. A., et al., (2007), "Highly Stable Pyrimidine-Motif Triplex Formation at Physiological pH Values by a Bridged Nucleic Acid Analogue," Angewandte Chemie International Edition. 46 (23): 4306-4309.

LNAs monomers include an additional bridge that connects the 2' oxygen and the 4' carbon of a ribose moiety to "locks" the ribose in the 3'-endo conformation.

Preferably, the modified nucleotides form standard Watson-Crick base pairs. For example, LNA bases form standard Watson-Crick base pairs but the locked configuration increases the rate and stability of the base pairing reaction (Jepsen et al., Oligonucleotides, 14, 130-146 (2004)). These properties render LNAs especially useful for the methods described herein.

The sequencing oligonucleotides comprising modified nucleotides may be designed using any method known in the art; a number of algorithms are known, and are commercially available (e.g., on the internet, for example at exiqon.com). See, e.g., You et al., Nuc. Acids. Res. 34:e60 (2006); McTigue et al., Biochemistry 43:5388-405 (2004); and Levin et al., Nuc. Acids. Res. 34:e142 (2006). For example, "gene walk" methods, similar to those used to design antisense oligonucleotides, may be used to optimize the sequence of sequencing oligonucleotide comprising modified nucleotides. In some embodiments, the GC content is between about 30-60%. General guidelines for designing oligonucleotides comprising LNAs are known in the art; for example, LNA sequences will bind very tightly to other LNA sequences, so it is preferable to avoid significant complementarity within an LNA. Contiguous runs of more than four LNA residues should be avoided where possible. In some embodiments, the LNAs are xylo-LNAs. (see, e.g., You et al., Nucleic Acids Research, 2006, Vol. 34, No. 8 e60).

For additional information regarding LNAs see U.S. Pat. Nos. 6,268,490; 6,734,291; 6,770,748; 6,794,499; 7,034,133; 7,053,207; 7,060,809; 7,084,125; and 7,572,582; and U.S. Pre-Grant Pub. Nos. 20100267018; 20100261175; and 20100035968; Koshkin et al. Tetrahedron 54, 3607-3630 (1998); Obika et al. Tetrahedron Lett. 39, 5401-5404 (1998); Jepsen et al., Oligonucleotides 14:130-146 (2004); Kauppinen et al., Drug Disc. Today 2(3):287-290 (2005); You et al., Nucleic Acids Research, 2006, Vol. 34, No. 8 e60; Ponting et al., Cell 136(4):629-641 (2009), and references cited therein.

In some embodiments, the sequencing oligonucleotide comprises more than one modified nucleotide that enhances base pair binding, relative to natural nucleotides, to a nucleotide of the template polynucleotide. For example, 10% or more of the bases of the sequencing oligonucleotide may be modified bases that enhance base pair binding. In some embodiments, 20% or more or 30% or more of the bases of the sequencing oligonucleotide are modified bases that enhance base pair binding. In some embodiments, 50% or less of the bases of the sequencing oligonucleotide are modified bases that enhance base pair binding. For example, from about 10% to about 50%, from about 20% to about 50%, or from about 30% to about 50% of the bases of the sequencing oligonucleotide are modified bases that enhance base pair binding.

In some embodiments, the sequence of the surface oligonucleotide, or a portion of the surface oligonucleotide, is the same as at least a portion of the sequencing oligonucleotide. If the sequencing oligonucleotide contains a modified nucleotide, the modified nucleotide will be considered equivalent, for purposes of the sequence of the sequencing oligonucleotide, to a corresponding natural nucleotide that base pairs with the same nucleotide as the modified nucleotide. for which the modified nucleotide base pairs.

The sequencing oligonucleotide may comprise additional nucleotides at the 3' end relative to the surface oligonucleotide. The additional nucleotides preferably are complementary to, and hybridize with, the template polynucleotide strand.

Typically, sequencing performed from a surface oligonucleotide involves several rounds of incorporation of nucleotides for which the identity of the incorporated nucleotides are not determined because the surface primer anneals to a region of the template strand that is not immediately preceding the index sequence. Such rounds of incorporation may be referred to as "dark cycles." Any suitable number of dark cycles of incorporation may be performed. For example, 2 to 20 dark incorporation cycles may be performed, such as 3 to 15, 5 to 10, or 6 to 8 dark cycles of incorporation may be performed. The sequence of the template strand to which the extended surface oligonucleotide is complementary during the dark cycles is preferably known. Once the appropriate number of dark cycles of incorporation (extension of the surface oligonucleotide using the template oligonucleotide strand as a template) are performed, sequencing (determining the identity of the nucleotides incorporated in subsequent cycles) may be performed.

The sequencing oligonucleotide may include additional nucleotides at the 3' end relative to the surface oligonucleotide, relative to the surface oligonucleotide primer, and may anneal to a region of the template strand that is immediately preceding the index sequence. Accordingly, the dark cycles may not be needed or may be reduced when using the sequencing primer. In the embodiments depicted in FIG. 7B, the sequencing oligonucleotide 337 includes seven additional nucleotides at the 3' end relative to the surface oligonucleotide 330.

As discussed throughout, provided are improved methods for sequencing polynucleotides. Exemplary sequencing methods are described, for example, in Bentley et al., Nature 456:53-59 (2008), WO 04/018497; US 7,057,026; WO 91/06678; WO 07/123744; U.S. Pat. Nos. 7,329,492; 7,211,414; 7,315,019; 7,405,281, and US 2008/0108082, each of which is incorporated herein by reference. One useful method for high throughput or rapid sequencing is sequencing by synthesis (SBS). SBS techniques include, but are not limited to, the Genome Analyzer systems (Illumina Inc., San Diego, CA) and the True Single Molecule Sequencing (tSMS)™ systems (Helicos BioSciences Corporation, Cambridge, MA). Briefly, a number of sequencing by synthesis reactions are used to elucidate the identity of a plurality of bases at target positions within a target sequence. All these reactions rely on the use of a target nucleic acid sequence having at least two domains; a first domain to which a sequencing primer will hybridize, and an adjacent second domain, for which sequence information is desired. Upon formation of an assay complex, extension enzymes are used to add deoxynucleotide triphosphates (dNTPs) to a sequencing primer that is hybridized to first domain, and each addition of dNTPs is read to determine the identity of the added dNTP. This may proceed for many cycles. SBS techniques such as, the Genome Analyzer systems (Illumina Inc., San Diego, CA) and the True Single Molecule Sequencing (tSMS)™ systems (Helicos BioSciences Corporation, Cambridge, MA), utilize labeled nucleotides to determine the sequence of a target nucleic acid molecule. A target nucleic acid molecule can be hybridized with a primer and incubated in the presence of a polymerase and a labeled nucleotide containing a blocking group. The primer is extended such that the nucleotide is incorporated. The presence of the blocking group permits only one round of incorporation, that is, the incorporation of a single nucleotide. The presence of the label permits identification of the incorporated nucleotide. A plurality of homogenous single nucleotide bases can be added during each cycle, such as used in the True Single Molecule Sequencing (tSMS)™ systems (Helicos BioSciences Corporation, Cambridge, MA) or, alternatively, all four nucleotide bases can be added during each cycle simultaneously, such as used in the Genome Analyzer systems (Illumina Inc., San Diego, CA), particularly when each base is associated with a distinguishable label. After identifying the incorporated nucleotide by its corresponding label, both the label and the blocking group can be removed, thereby allowing a subsequent round of incorporation and identification. Determining the identity of the added nucleotide base includes, in some embodiments, repeated exposure of the newly added labeled bases a light source that can induce a detectable emission due the addition of a specific nucleotide base, i.e. dATP, dCTP, dGTP or dTTP. The methods and compositions disclosed herein are particularly useful for such SBS techniques. In addition, the methods and compositions described herein may be particularly useful for sequencing from an array of nucleic acids, where multiple sequences can be read simultaneously from multiple positions on the array since each nucleotide at each position can be identified based on its identifiable label. Exemplary methods are described in US 2009/0088327; US 2010/0028885; and US 2009/0325172, each of which is incorporated herein by reference.

The sequencing methods described herein may be performed in any suitable manner, using any suitable equipment. In some embodiments, the sequencing methods employ a solid support on which the multiple template polynucleotide strands are immobilized. The term immobilized as used herein is intended to encompass direct or indirect attachment to a solid support via covalent or non-covalent bond(s). In particular embodiments, all that is required is that the polynucleotides remain immobilized or attached to a support under conditions in which it is intended to use the support, for example in applications requiring nucleic acid amplification and/or sequencing. For example, oligonucleotides or primers may be immobilized such that a 3' end is available for enzymatic extension and/or at least a portion of the sequence is capable of hybridizing to a complementary sequence. Immobilization can occur via hybridization to a surface attached primer, in which case the immobilized primer or oligonucleotide may be in the 3'-5' orientation. Alternatively, immobilization may occur by non-base-pairing hybridization, such as the covalent attachment.

By way of example, the polynucleotides may be attached to the surface by hybridization or annealing to one or more primers in a patch of primers. Hybridization may be accomplished, for example, by ligating an adapter to the ends of the template polynucleotides. The nucleic acid sequence of the adapter can be complementary to the nucleic acid sequence of the primer, thus, allowing the adapter to bind or hybridize to the primer on the surface. Optionally, the polynucleotides may be single- or double-stranded and adapters may be added to the 5' and/or 3' ends of the polynucleotides. Optionally, the polynucleotides may be double-stranded, and adapters may be ligated onto the 3' ends of double-stranded polynucleotide. Optionally, polynucleotides may be used without any adapter. In some embodiments, template polynucleotides may be attached to a surface by interactions other than hybridization to a complementary primer. For example, a polynucleotide may be covalently attached to a surface using a chemical linkage such as those resulting from click chemistry or a receptor-ligand interaction such as streptavidin-biotin binding.

Primer oligonucleotides, oligonucleotide primers and primers are used throughout interchangeably and are polynucleotide sequences that are capable of annealing specifically to one or more polynucleotide templates to be amplified or sequenced. Generally, primer oligonucleotides are single-stranded or partially single-stranded. Primers may also contain a mixture of non-natural bases, non-nucleotide chemical modifications or non-natural backbone linkages so long as the non-natural entities do not interfere with the function of the primer. Optionally, a patch of primers on a surface of a solid support may comprise one or more different pluralities of primer molecules. By way of example, a patch may comprise a first, second, third, fourth, or more pluralities of primer molecules each plurality having a different sequence. It will be understood that for embodiments having different pluralities of primers in a single patch, the different pluralities of primers may share a common sequence so long as there is a sequence difference between at least a portion of the different pluralities. For example, a first plurality of primers may share a sequence with a second plurality of primers as long the primers in one plurality have a different sequence not found in the primers of the other plurality.

The template polynucleotides may be amplified on the surface of the solid support. Polynucleotide amplification includes the process of amplifying or increasing the numbers of a polynucleotide template and/or of a complement thereof that are present, by producing one or more copies of the template and/or or its complement. Amplification may be carried out by a variety of known methods under conditions including, but not limited to, thermocycling amplification or isothermal amplification. For example, methods for carrying out amplification are described in U.S. Publication No. 2009/0226975; WO 98/44151; WO 00/18957; WO 02/46456; WO 06/064199; and WO 07/010251; which are incorporated by reference herein in their entireties. Briefly, in the provided methods, amplification can occur on the surface to which the polynucleotide molecules are attached. This type of amplification can be referred to as solid phase amplification, which when used in reference to polynucleotides, refers to any polynucleotide amplification reaction carried out on or in association with a surface (e.g., a solid support). Typically, all or a portion of the amplified products are synthesized by extension of an immobilized primer. Solid phase amplification reactions are analogous to standard solution phase amplifications except that at least one of the amplification primers is immobilized on a surface (e.g., a solid support).

Suitable conditions include providing appropriate buffers/solutions for amplifying polynucleotides. Such solutions include, for example, an enzyme with polymerase activity, nucleotide triphosphates, and, optionally, additives such as DMSO or betaine. Optionally, amplification is carried out in the presence of a recombinase agent as described in U.S. Pat. No. 7,485,428, which is incorporated by reference herein in its entirety, which allows for amplification without thermal melting. Briefly, recombinase agents such as the RecA protein from *E. coli* (or a RecA relative from other phyla), in the presence of, for example, ATP, dATP, ddATP, UTP, or ATPγS, will form a nucleoprotein filament around single-stranded DNA (e.g., a primer). When this complex comes in contact with homologous sequences the recombinase agent will catalyze a strand invasion reaction and pairing of the primer with the homologous strand of the target DNA. The original pairing strand is displaced by strand invasion leaving a bubble of single stranded DNA in the region, which serves as a template for amplification.

Solid-phase amplification may comprise a polynucleotide amplification reaction comprising only one species of oligonucleotide primer immobilized to a surface. Alternatively, the surface may comprise a plurality of first and second different immobilized oligonucleotide primer species. Solid phase nucleic acid amplification reactions generally comprise at least one of two different types of nucleic acid amplification, interfacial and surface (or bridge) amplification. For instance, in interfacial amplification the solid support comprises a template polynucleotide that is indirectly immobilized to the solid support by hybridization to an immobilized oligonucleotide primer, the immobilized primer may be extended in the course of a polymerase-catalyzed, template-directed elongation reaction (e.g., primer extension) to generate an immobilized polynucleotide that remains attached to the solid support. After the extension phase, the polynucleotides (e.g., template and its complementary product) are denatured such that the template polynucleotide is released into solution and made available for hybridization to another immobilized oligonucleotide primer. The template polynucleotide may be made available in 1, 2, 3, 4, 5 or more rounds of primer extension or may be washed out of the reaction after 1, 2, 3, 4, 5 or more rounds of primer extension.

In surface (or bridge) amplification, an immobilized polynucleotide hybridizes to an immobilized oligonucleotide primer. The 3' end of the immobilized polynucleotide provides the template for a polymerase-catalyzed, template-directed elongation reaction (e.g., primer extension) extending from the immobilized oligonucleotide primer. The resulting double-stranded product "bridges" the two primers and both strands are covalently attached to the support. In the next cycle, following denaturation that yields a pair of single strands (the immobilized template and the extended-primer product) immobilized to the solid support, both immobilized strands can serve as templates for new primer extension.

Amplification may be used to produce colonies of immobilized polynucleotides. For example, the methods can produce clustered arrays of polynucleotide colonies, analogous to those described in U.S. Pat. No. 7,115,400; U.S. Publication No. 2005/0100900; WO 00/18957; and WO 98/44151, which are incorporated by reference herein in their entireties. "Clusters" and "colonies" are used interchangeably and refer to a plurality of copies of a polynucleotide having the same sequence and/or complements thereof attached to a surface. Typically, the cluster comprises a plurality of copies of a polynucleotide having the same sequence and/or complements thereof, attached via their 5' termini to the surface. The copies polynucleotides making up the clusters may be in a single or double stranded form.

Thus, the plurality of template polynucleotides may be in a cluster, each cluster containing template polynucleotides of the same sequence. A plurality of clusters can be sequenced, each cluster comprising polynucleotides of the same sequence. Optionally, the sequence of the polynucleotides in a first cluster is different from the sequence of the nucleic acid molecules of a second cluster. Optionally, the cluster is formed by annealing to a primer on a solid surface a template polynucleotide and amplifying the template polynucleotide under conditions to form the cluster comprising the plurality of template polynucleotides of the same sequence. Amplification can be thermal or isothermal.

Each colony may comprise polynucleotides of the same sequences. In particular embodiments, the sequence of the polynucleotides of one colony is different from the sequence of the polynucleotides of another colony. Thus, each colony comprises polynucleotides having different nucleic acid sequences. All the immobilized polynucleotides in a colony are typically produced by amplification of the same polynucleotide. In some embodiments, it is possible that a colony of immobilized polynucleotides contains one or more primers without an immobilized polynucleotide to which another polynucleotide of different sequence may bind upon additional application of solutions containing free or unbound polynucleotides. However, due to the lack of sufficient numbers of free primers in a colony, this second or invading polynucleotide may not amplify to significant numbers. The second or invading polynucleotide typically is less than 1, 0.5, 0.25, 0.1, 0.001 or 0.0001% of the total population of polynucleotides in a single colony. Thus, the second or invading polynucleotide may not be optically detected or detection of the second or invading polynucleotide is considered background noise or does not interfere with detection of the original, immobilized polynucleotides in the colony. In such embodiments, the colony will be apparently homogeneous or uniform in accordance with the resolution of the methods or apparatus used to detect the colony.

The clusters may have different shapes, sizes and densities depending on the conditions used. For example, clusters may have a shape that is substantially round, multi-sided, donut-shaped or ring-shaped. The diameter or maximum cross section of a cluster may be from about 0.2 µm to about 6 µm, about 0.3 µm to about 4 µm, about 0.4 µm to about 3 µm, about 0.5 µm to about 2 µm, about 0.75 µm to about 1.5 µm, or any intervening diameter. Optionally, the diameter or maximum cross section of a cluster may be at least about 0.5 µm, at least about 1 µm, at least about 1.5 µm, at least about 2 µm, at least about 2.5 µm, at least about 3 µm, at least about 4 µm, at least about 5 µm, or at least about 6 µm. The diameter of a cluster may be influenced by a number of parameters including, but not limited to, the number of amplification cycles performed in producing the cluster, the length of the polynucleotide template, the GC content of the polynucleotide template, the shape of a patch to which the primers are attached, or the density of primers attached to the surface upon which clusters are formed. However, as discussed above, in all cases, the diameter of a cluster may be no larger than the patch upon which the cluster is formed. For example, if a patch is a bead, the cluster size will be no larger than the surface area of the bead. The density of clusters can be in the range of at least about $0.1/mm^2$, at least about $1/mm^2$, at least about $10/mm^2$, at least about $100/mm^2$, at least about $1,000/mm^2$, at least about $10,000/mm^2$ to at least about $100,000/mm^2$. Optionally, the clusters have a density of, for example, $100,000/mm^2$ to $1,000,000/mm^2$ or $1,000,000/mm^2$ to $10,000,000/mm^2$. The methods provided herein can produce colonies that are of approximately equal size. This occurs regardless of the differences in efficiencies of amplification of the polynucleotides of different sequence.

Clusters may be detected, for example, using a suitable imaging means, such as, a confocal imaging device or a charge coupled device (CCD) or CMOS camera. Exemplary imaging devices include, but are not limited to, those described in U.S. Pat. Nos. 7,329,860; 5,754,291; and 5,981,956; and WO 2007/123744, each of which is herein incorporated by reference in its entirety. The imaging apparatus may be used to determine a reference position in a cluster or in a plurality of clusters on the surface, such as the location, boundary, diameter, area, shape, overlap and/or center of one or a plurality of clusters (and/or of a detectable signal originating therefrom). Such a reference position may be recorded, documented, annotated, converted into an interpretable signal, or the like, to yield meaningful information.

As used herein the term support refers to a substrate for attaching polynucleotides. A support is a material having a rigid or semi-rigid surface to which a polynucleotide can be attached or upon which nucleic acids can be synthesized and/or modified. Supports can include any resin, gel, bead, well, column, chip, flowcell, membrane, matrix, plate, filter, glass, controlled pore glass (CPG), polymer support, membrane, paper, plastic, plastic tube or tablet, plastic bead, glass bead, slide, ceramic, silicon chip, multi-well plate, nylon membrane, fiber optic, and PVDF membrane.

A support may be substantially planar and may include any flat wafer-like substrates and flat substrates having wells, such as a microtiter plate, including 96-well plates. Exemplary flat substrates include chips, slides, etched substrates, microtiter plates, and flow cell reactors, including multi-lane flow cell reactors having multiple microfluidic channels, such as the eight-channel flow cell used in the cBot sequencing workstation (Illumina, Inc., San Diego, CA). Exemplary flow cells are described in WO 2007/123744, which is incorporated herein by reference in its entirety. Optionally, the flowcell is a patterned flowcell. Suitable patterned flowcells include, but are not limited to, flowcells described in WO 2008/157640, which is incorporated by reference herein in its entirety.

A support may also include beads, including magnetic beads, hollow beads, and solid beads. Beads may be used in conjunction with flat supports, such flat supports optionally also containing wells. Beads, or alternatively microspheres, refer generally to a small body made of a rigid or semi-rigid material. The body may have a shape characterized, for example, as a sphere, oval, microsphere, or other recognized particle shape whether having regular or irregular dimensions. The sizes of beads, in particular, include, without limitation, about 1 µm, about 2 µm, about 3 µm, about 5 µm, about 10 µm, about 20 µm, about 30 µm, about 40 µm, about 60 µm, about 100 µm, about 150 µm or about 200 µm in diameter. Other particles may be used in ways similar to those described herein for beads and microspheres.

The composition of a support may vary depending, for example, on the format, chemistry and/or method of attachment and/or on the method of nucleic acid synthesis. Support materials that can be used in accordance with the present disclosure include, but are not limited to, polypropylene, polyethylene, polybutylene, polyurethanes, nylon, metals, and other suitable materials. Exemplary compositions include supports, and chemical functionalities imparted thereto, used in polypeptide, polynucleotide and/or organic moiety synthesis. Such compositions include, for example, plastics, ceramics, glass, polystyrene, melamine, methylstyrene, acrylic polymers, paramagnetic materials, thoria sol, carbon graphite, titanium dioxide, latex or cross-linked dextrans such as Sepharose™, cellulose, nylon, cross-linked micelles and Teflon™, as well as any other materials which can be found described in, for example, "*Microsphere Detection Guide*" from Bangs Laboratories, Fishers IN, which is incorporated herein by reference. A support particle may be made of cross-linked starch, dextrans, cellulose, proteins, organic polymers including styrene polymers including polystyrene and methylstyrene as well as other styrene co-polymers, plastics, glass, ceramics, acrylic polymers, magnetically responsive materials, colloids, thoriasol, carbon graphite, titanium dioxide, nylon, latex, or TEFLON®. "Microsphere Detection Guide" from Bangs Laboratories, Fishers, Inc., hereby incorporated by reference in its entirety, is a helpful guide. Further exemplary supports within the scope of the present disclosure include, for example, those described in US Application Publication No. 02/0102578 and U.S. Pat. No. 6,429,027, both of which are incorporated herein by reference in their entirety.

The template polynucleotides to be sequenced may be obtained from any biological sample using known, routine methods. Suitable biological samples include, but are not limited to, a blood sample, biopsy specimen, tissue explant, organ culture, biological fluid or any other tissue or cell preparation, or fraction or derivative thereof or isolated therefrom. The biological sample can be a primary cell culture or culture adapted cell line including but not limited to genetically engineered cell lines that may contain chromosomally integrated or episomal recombinant nucleic acid sequences, immortalized or immortalizable cell lines, somatic cell hybrid cell lines, differentiated or differentiatable cell lines, transformed cell lines, stem cells, germ cells (e.g. sperm, oocytes), transformed cell lines and the like. For example, polynucleotide molecules may be obtained from primary cells, cell lines, freshly isolated cells or tissues, frozen cells or tissues, paraffin embedded cells or tissues, fixed cells or tissues, and/or laser dissected cells or tissues. Biological samples can be obtained from any subject or biological source including, for example, human or non-human animals, including mammals and non-mammals, vertebrates and invertebrates, and may also be any multicellular organism or single-celled organism such as a eukaryotic (including plants and algae) or prokaryotic organism, archaeon, microorganisms (e.g. bacteria, archaea, fungi, protists, viruses), and aquatic plankton.

Once the polynucleotides are obtained, a plurality of polynucleotides molecules of different sequence for use in the provided methods may be prepared using a variety of standard techniques available and known. Exemplary methods of polynucleotide molecule preparation include, but are not limited to, those described in Bentley et al., Nature 456:49-51 (2008); U.S. Pat. No. 7,115,400; and U.S. Patent Application Publication Nos. 2007/0128624; 2009/0226975; 2005/0100900; 2005/0059048; 2007/0110638; and 2007/0128624, each of which is herein incorporated by reference in its entirety. The template polynucleotides may contain a variety of sequences including, but not limited to, universal sequences and known or unknown sequences. For example, polynucleotide may comprise one or more regions of known sequence (e.g., an adaptor) located on the 5' and/or 3' ends. Such template polynucleotides may be formed by attaching adapters to the ends of a polynucleotides of unknown sequence. When the polynucleotides comprise known sequences on the 5' and 3' ends, the known sequences may be the same or different sequences. Optionally, a known sequence located on the 5' and/or 3' ends of the polynucleotides is capable of hybridizing to one or more primers immobilized on the surface. For example, a polynucleotide comprising a 5' known sequence may hybridize to a first plurality of primers while the 3' known sequence may hybridize to a second plurality of primers. Optionally, polynucleotides comprise one or more detectable labels. The one or more detectable labels may be attached to the polynucleotide template at the 5' end, at the 3' end, and/or at any nucleotide position within the polynucleotide molecule. The polynucleotides for use in the provided methods may comprise the polynucleotide to be amplified and/or sequenced and, optionally, short nucleic acid sequences at the 5' and/or 3' end(s).

A short nucleic acid sequence that is added to the 5' and/or 3' end of a polynucleotide may be a universal sequence. A universal sequence is a region of nucleotide sequence that is common to, i.e., shared by, two or more polynucleotides, where the two or more polynucleotides also have regions of sequence differences. A universal sequence that may be present in different members of a plurality of polynucleotides may allow the replication or amplification of multiple different sequences using a single universal primer that is complementary to the universal sequence. Similarly, at least one, two (e.g., a pair) or more universal sequences that may be present in different members of a collection of polynucleotides may allow the replication or amplification of multiple different sequences using at least one, two (e.g., a pair) or more single universal primers that are complementary to the universal sequences. Thus, a universal primer includes a sequence that may hybridize specifically to such a universal sequence. The polynucleotide may be modified to attach universal adapters (e.g., non-target nucleic acid sequences) to one or both ends of the different target sequences, the adapters providing sites for hybridization of universal primers. This approach has the advantage that it is not necessary to design a specific pair of primers for each polynucleotide to be generated, amplified, sequenced, and/or otherwise analyzed; a single pair of primers can be used for amplification of different polynucleotides provided that each polynucleotide is modified by addition of the same universal primer-binding sequences to its 5' and 3' ends.

The polynucleotides may also be modified to include any nucleic acid sequence desirable using standard, known methods. Such additional sequences may include, for example, restriction enzyme sites, or indexing tags in order to permit identification of amplification products of a given nucleic acid sequence.

As used herein, the term different when used in reference to two or more polynucleotides means that the two or more polynucleotides have nucleotide sequences that are not the same. For example, two polynucleotides can differ in the content and order of nucleotides in the sequence of one polynucleotide compared to the other polynucleotide. The term can be used to describe polynucleotides whether they are referred to as copies, amplicons, templates, targets, primers, oligonucleotides, or the like.

Disclosed are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation may not be explicitly disclosed, each is specifically contemplated and described herein. For example, if a method is disclosed and discussed and a number of modifications that can be made to the method steps are discussed, each and every combination and permutation of the method steps, and the modifications that are possible are specifically contemplated unless specifically indicated to the contrary. Likewise, any subset or combination of these is also specifically contemplated and disclosed. This concept applies to all aspects of this disclosure. Thus, if there are a variety of additional steps that can be performed it is understood that each of these additional steps can be performed with any specific method steps or combination of method steps of the disclosed methods, and that each such combination or subset of combinations is specifically contemplated and should be considered disclosed.

Throughout this application, various publications are referenced. The disclosures of these publications in their entireties are hereby incorporated by reference into this application.

EXAMPLES

1. Preparation of Primers

Various free index 2 primers were prepared using Illumina Inc.'s P5 surface primer as the starting sequence in an attempt to produce a modified index 2 primer suitable for sequencing an I5 index sequence associated with an adapter added to a DNA fragment when using Illumina, Inc.'s TruSight® Tumor 170 library preparation kit. The various free index 2 primers were configured to hybridize to P5' sequence the 3' end of the adapter.

The various free index 2 primers were made and tested and compared to sequencing of index 2 using Illumina, Inc.'s Index2 primer (Illumina, Inc. MiniSeq®, High Output sequencing kit) on an Illumina, Inc. MiniSeq® sequencer.

The sequences of the primers used and the grafted P5 oligo are presented below in Table 1.

TABLE 1

Sequence of primers

| Primer Name | Sequence |
|---|---|
| Index2 primer | AGATCGGAAGAGCGTCGTGTAGGGAAAGAGTGT (SEQ ID NO: 13) |
| Grafted P5 oligo | AATGATACGGCGACCACCGAGA (SEQ ID NO: 14) |
| HP19 v0 | AATGATACGGCGACCACCGAGATCTACAC (SEQ ID NO: 15) |
| HP19 v1 | AATGATACGGCGACCACCGAGATCTACAC (SEQ ID NO: 16) |
| HP19 v2 | AATGATACGGCGACCACCGAGATCTACAC (SEQ ID NO: 17) |

The HP19 primers are the modified index 2 primers that use the sequence of the grafted P5 oligo as the starting sequence. Bolded and larger font indicates LNA modification.

The modified sequencing oligonucleotide primers were purchased from Qiagen.

The various versions of the HP19 primers include seven additional nucleotides on the 3' end relative to the P5 oligo. When the P5 oligo is used to read the index 2 sequence, seven rounds of dark incorporation of nucleotides is performed prior to reading the index sequence. Such dark cycles are not necessary when using free primers, such as the various versions of HP19, because the free primers anneal immediately adjacent to the index sequence. Accordingly, the seven additional nucleotides are added so that the first cycle of sequencing begins reading the index 2 sequence.

2. Testing of Primers

Using the Illumina, Inc. MiniSeq® sequencer and MiniSeq®, High Output sequencing kit, sequencing was preformed on a library prepared using the Illumina, Inc. TruSight® Tumor 170 library preparation kit. Sequencing was performed using the following workflow: R1 (read 1, 36 cycles using kitted read 1 primer)/R2 (index 2, 9 cycles using HP19 v0 primer)/R3 (index 2, 9 cycles using HP19 v1 primer)/R4 (index 2, 9 cycles using HP19 v2 primer)/R5 (index 1, 8 cycles using kitted index 1 primer)/Paired End Turn/R6 (index 2, 8 cycles using kitted index 2 primer)/R7 (read 2, 36 cycles using kitted read 2 primer). Between each step, the previously extended primer was removed by denaturing and washing, and the next primer was hybridized. The intensity of the signal produced at each cycle of was measured. The results are presented in FIG. 8.

Figure 8:
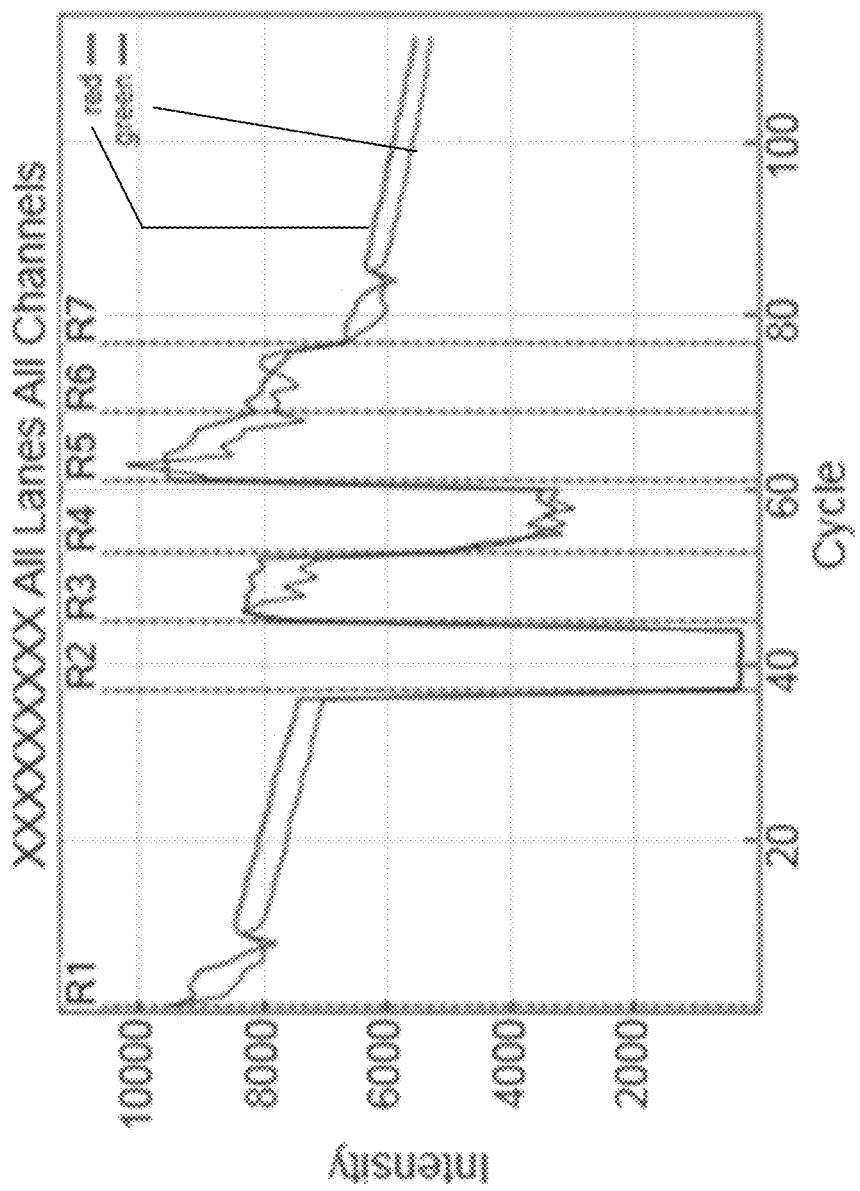
FIG. 8 is plot of signal intensity per cycle of sequencing following hybridization of different primers to a template polynucleotide. R1=read 1. R2=modified index 2 (using HP19 v0 primer). R3=modified index 2 (using HP19 v1 primer). R4=modified index 2 (using HP19 v2 primer). R5=index 1. R6=standard index 2. R7=read 2. A paired end turn is performed between R5 and R6.

As shown in FIG. 8, barely any signal intensity was detected when using the HP19 v0 primer, which included no modified nucleotides to enhance the hybridization affinity of the primer for the P5' sequence of the target polynucleotide strand (R2). In contrast, the HP19 v1 (R3) and HP19 v2 (R4) primers, which included modified nucleotides, produced sufficient signal intensity for the sequence of index 2 to be read. HP19 v1, which had the highest percentage (8/26) of modified bases gave the highest signal intensity (R3).

Figure 9:
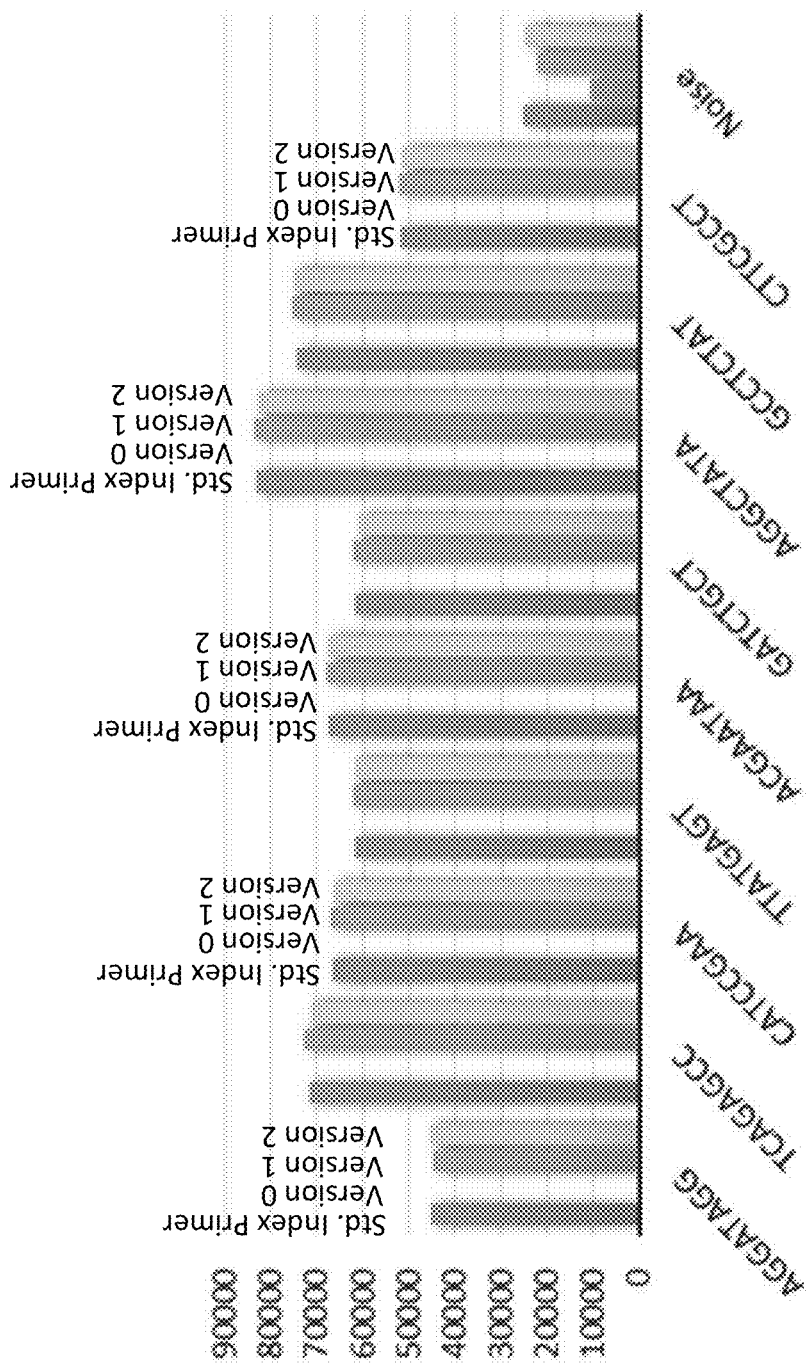
FIG. 9 is a bar graph of reads count obtained by sequencing various index sequences using a standard index 2 primer, and three modified index 2 primers (HP19 v0, version 0; HP19 v1; version 1; and HP19 v2, version 2). The index sequences that were sequenced were AGGATAGG (SEQ ID NO: 4), TCAGAGCC (SEQ ID NO: 5), CATCCGGAA (SEQ ID NO: 6), TTATGAGT (SEQ ID NO: 7), ACGAATAA (SEQ ID NO: 8), GATCTGCT (SEQ ID NO: 9), AGGCTATA (SEQ ID NO: 10), GCCTCTAT (SEQ ID NO: 11), CTTCGCTT (SEQ ID NO: 12).
Figure 10:
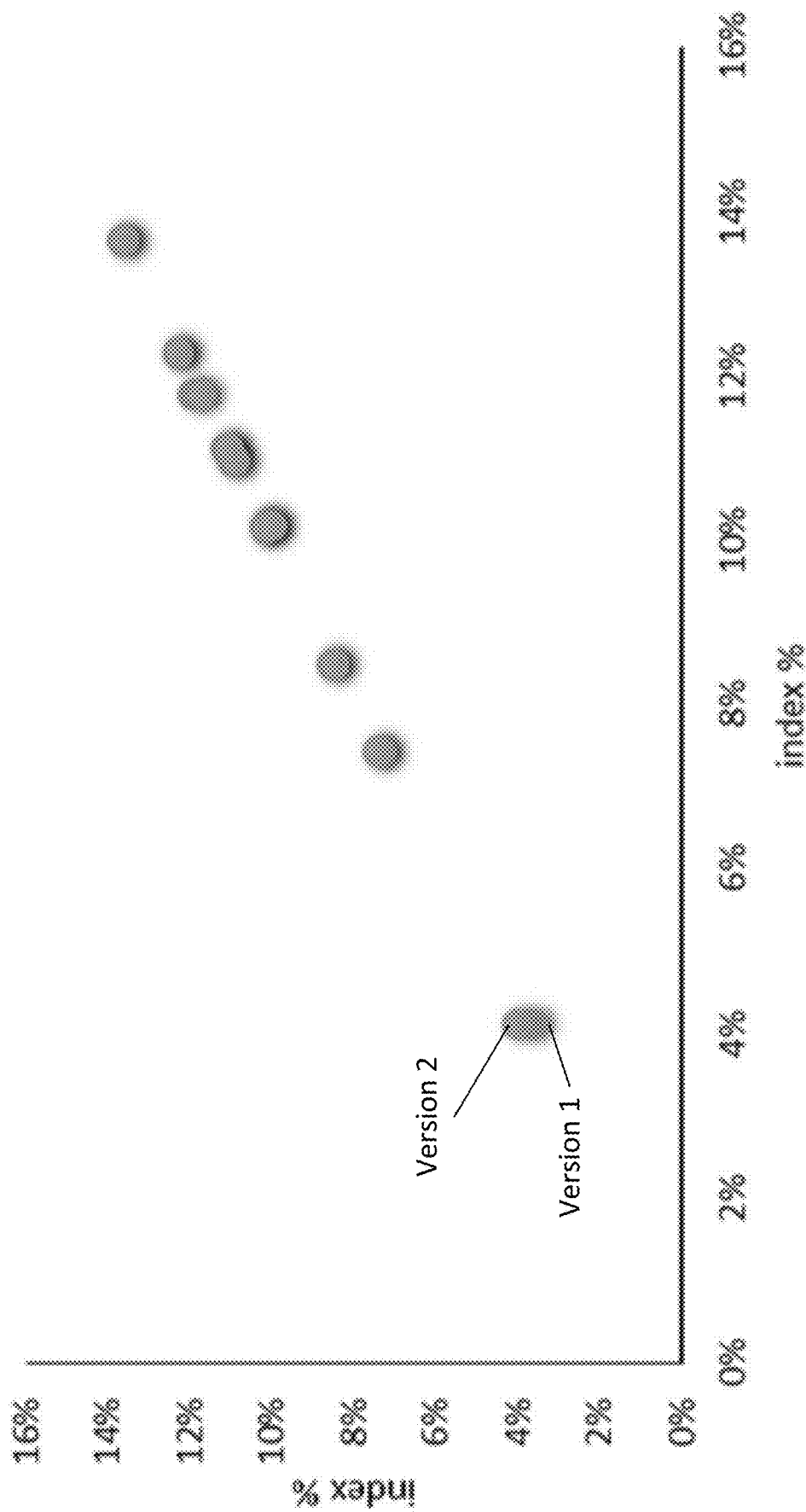
FIG. 10 is a plot of the correlation of the reads count obtained using HP19 v1 and HP19 v2 primers to sequence the various indices in FIG. 9 with the reads count obtained using the standard index 2 primer.

The i5 index representation was extracted for R2, R3, R4, and R6, then compared with the known indexes. The plots presented in FIGS. 9 and 10 show how both HP19 v1 and HP19 v2 give index representation distributions that are indistinguishable from that collected in the standard read2 indexing read. FIG. 9 is a bar graph of reads count, and FIG. 10 is a plot of the correlation of HP19 v1 and HP19 v2 primers with the standard read2 index primer.

3. Performance where Both Index Reads Carried Out Ahead of Read 1

Using the Illumina, Inc. MiniSeq® sequencer and MiniSeq®, High Output sequencing kit, sequencing was performed on a library prepared using the Illumina, Inc. TruSight® Tumor 170 library preparation kit. Sequencing was performed using the following workflow: R1 (index 2, 8 cycles using HP19 v1 primer)/R2 (index 1, 8 cycles using kitted index 1 primer)/R3 (read 1, 36 cycles using kitted read 1 primer)/Paired End Turn/R4 (index 2, 8 cycles using kilted index 2 primer)/R5 (read 2, 36 cycles using kitted read 2 primer). Between each step, the previously extended primer was removed by denaturing and washing, and the next primer was hybridized. The intensity of the signal produced at each cycle of was measured. The results are presented in FIG. 11.

Figure 12:
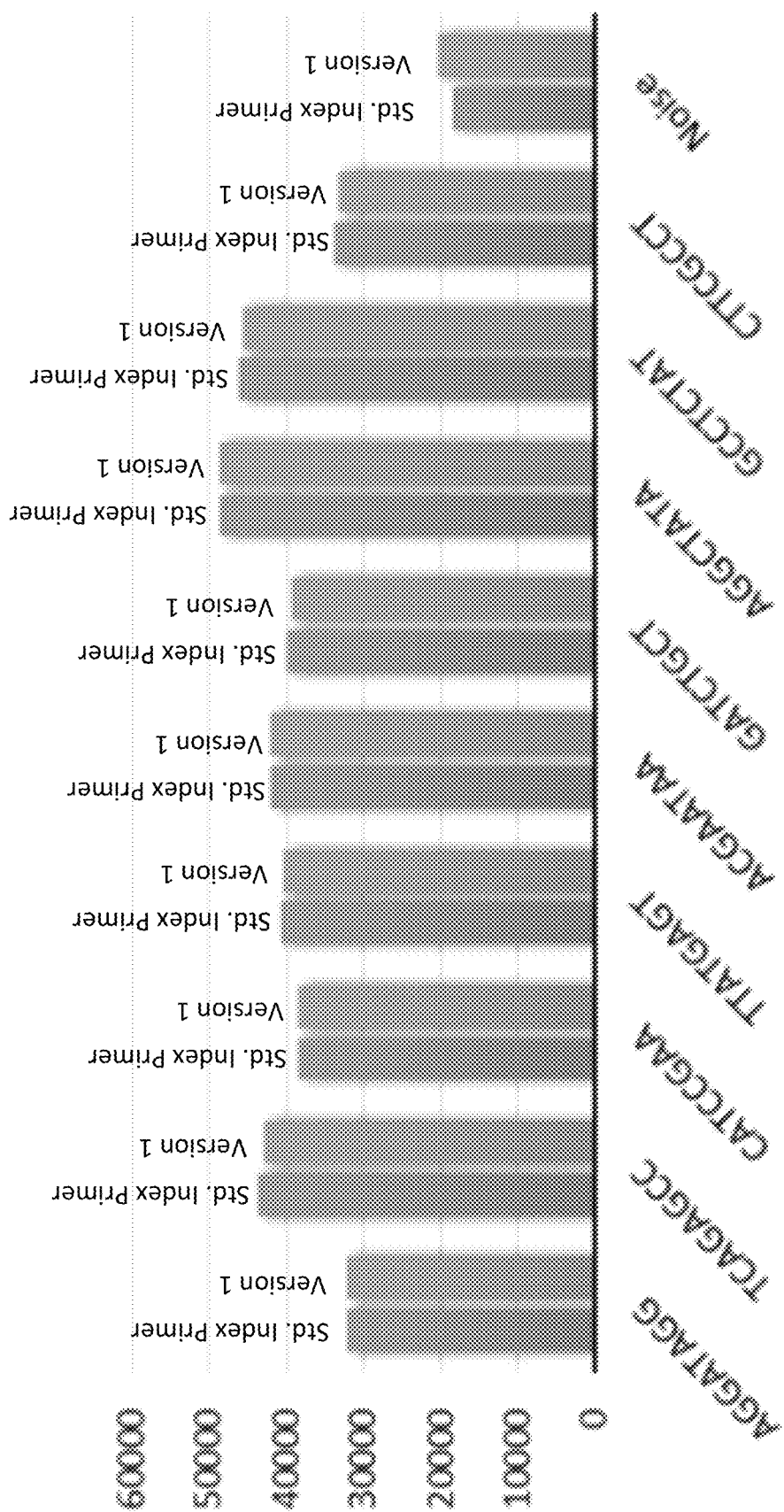
FIG. 12 is a bar graph of reads count obtained by sequencing various index sequences using a standard index 2 primer and modified index 2 primer (HP19 v1, version 1). The index sequences that were sequenced were AGGATAGG (SEQ ID NO: 4), TCAGAGCC (SEQ ID NO: 5), CATCCGGAA (SEQ ID NO: 6), TTATGAGT (SEQ ID NO: 7), ACGAATAA (SEQ ID NO: 8), GATCTGCT (SEQ ID NO: 9), AGGCTATA (SEQ ID NO: 10), GCCTCTAT (SEQ ID NO: 11), CTTCGCTT (SEQ ID NO: 12).

Index analysis indicated that no penalty came from performing both indexing reads ahead of the first read (Read 1) sequencing. The i5 index representation was extracted for R1 and R4 (the latter considered the reference) and were compared between themselves. FIG. 12, which is a bar graph showing reads count, illustrates how HP19 v1 gave index representation distributions that are indistinguishable from that collected in the standard read2 indexing read.

Figure 11:
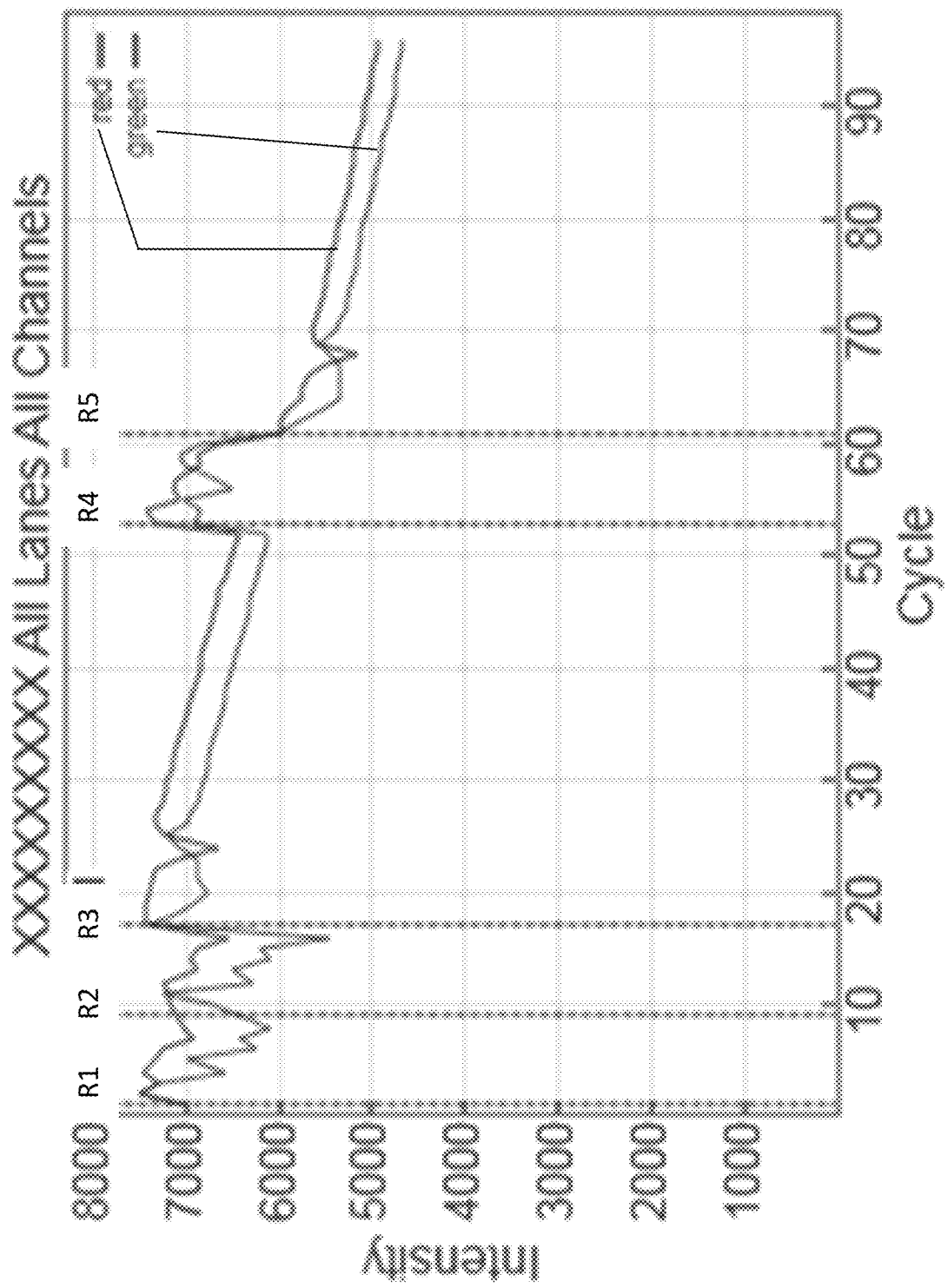
FIG. 11 is plot of signal intensity per cycle of sequencing following hybridization of different primers to a template polynucleotide. R1=modified index 2 (using HP19 v1 primer). R2=index 1. R3=read 1. R6=standard index 2. R7=read 2. A paired end turn is performed between R3 and R6.

The workflow used to generate the results presented in FIG. 11 enables key advantages associated with the use of the modified index primers (e.g., HP12 v1 and HP10 v2). For example, complex libraries may be demultiplexed independently of performing the paired end turn and Read 2 in cases where insert sizes or short or additional insert sequencing is not needed or desired. In addition, dynamic imaging (e.g., the ability to fine-tune cycles and tile numbers depending on the composition of the library) may be enabled.

The ability to demultiplex independently of Read 2 offers the possibility to implement significant time savings in applications for which index representation is of importance. For example, if the insert sequence (or a sufficient portion thereof) can be obtained in a single longer run (read 1) rather than two shorter runs (read 1 and read 2, which follows the paired end turn), the time of the paired end turn and time in preparing and rehybridization of the read 2 primer may be saved.

A number of embodiments have been described. Nevertheless, it will be understood that various modifications may be made. Accordingly, other embodiments are within the scope of the following claims.

---

What is claimed is:

1. A method, comprising:
providing a solid surface, a surface oligonucleotide covalently bound to the solid surface and having a free 3' end, and a template polynucleotide covalently bound to the solid surface, the template polynucleotide comprising a 3' adapter portion, a 5' adapter portion, and an insert sequence between the 3' and 5' adapter portions, the 3' adapter portion comprising (i) a first primer hybridization sequence configured to hybridize to a first read primer, (ii) a 3' adapter index sequence, and (iii) a 3' end portion comprising a free 3' end, wherein the 3' end portion is (i) 3' of the first primer hybridization sequence and the 3' adapter index sequence, and (ii) is configured to hybridize to at least a portion of the surface oligonucleotide such that a copy polynucleotide may be synthesized by extending the surface oligonucleotide using the template polynucleotide as a template;
providing a sequencing oligonucleotide, wherein the sequencing oligonucleotide hybridizes to the 3' end portion of the template polynucleotide with greater affinity than the surface oligonucleotide, and wherein the sequencing oligonucleotide comprises a modified nucleotide that enhances base pair binding, relative to a natural nucleotide, to a nucleotide of the template polynucleotide; and
extending the sequencing oligonucleotide in a sequencing process using the template polynucleotide as a template to sequence at least the 3' adapter index sequence.

2. The method of claim 1, wherein the nucleotide sequence of the surface oligonucleotide is the same as at least a portion of the sequencing oligonucleotide.

3. The method of claim 1, wherein the modified nucleotide is a locked nucleotide or a bridged nucleotide.

4. The method of claim 1, wherein the sequencing oligonucleotide comprises a plurality of modified nucleotides that enhance base pair binding, relative to natural nucleotides, to nucleotides of the template polynucleotide.

5. The method of claim 4, wherein 10% or more of the nucleotides of the sequencing oligonucleotide are modified nucleotides.

6. The method of claim 4, wherein 50% or less of the nucleotides of the sequencing oligonucleotide are modified nucleotides.

7. The method of claim 4, wherein the nucleotide sequence of the surface oligonucleotide is the same as a portion of the sequencing oligonucleotide, and wherein the modified nucleotides are comprised in the portion of the sequencing oligonucleotide having the same sequence as the surface nucleotide.

8. The method of claim 1, wherein the 5' adapter portion comprises a second primer hybridization sequence and a 5' adapter index sequence, and wherein the method further comprises hybridizing an index primer to the second primer hybridization sequence and extending the index primer using the template polynucleotide as a template to sequence the 5' adapter index sequence, wherein the sequence of the 5' and 3' adapter sequences are different.

9. The method of claim 8, wherein said hybridizing the index primer to the template polynucleotide and extending the index primer to sequence the 5' adapter index sequence occurs prior to sequencing the 3' adapter index sequence.

10. The method of claim 1, further comprising hybridizing the first read primer to the first primer hybridization sequence and extending the first read primer using the template polynucleotide as a template to sequence a first read sequence of the insert sequence.

11. The method of claim 8, further comprising hybridizing the first read primer to the first primer hybridization sequence and extending the first read primer using the template polynucleotide as a template to sequence a first read sequence of the insert sequence.

12. The method of claim 11, wherein said hybridizing the first read primer to the first primer hybridization sequence and extending the first read primer to sequence the first read sequence occurs after sequencing the 5' adapter index sequence.

13. The method of claim 11, wherein said hybridizing the first read primer to the first primer hybridization sequence and extending the first read primer to sequence the first read sequence occurs after sequencing the 5' adapter index sequence and the 3' adapter index sequence.

14. The method of claim 1, further comprising synthesizing the copy polynucleotide by extending the surface oligonucleotide using the template polynucleotide as a template, wherein the copy polynucleotide has a sequence complementary to the template polynucleotide.

15. The method of claim 14, wherein said synthesizing the copy polynucleotide by extending the surface polynucleotide occurs after sequencing the 5' adapter index sequence, the 3' adapter index sequence, and the first read sequence.

16. The method of claim 14, further comprising hybridizing a second read primer to a portion of the copy polynucleotide comprising a sequence complementary to the second primer hybridization sequence and extending the second read primer using the copy polynucleotide as a template to sequence a second read sequence of a sequence complementary to the insert sequence.

17. The method of claim 1, wherein the solid surface is substantially planar.

18. The method of claim 1, wherein the solid surface is the surface of a flow cell.

* * * * *

SEQUENCE LISTING

<160> NUMBER OF SEQ ID NOS: 17

<210> SEQ ID NO 1
<211> LENGTH: 22
<212> TYPE: DNA
<213> ORGANISM: Artificial
<220> FEATURE:
<223> OTHER INFORMATION: Primer

<400> SEQUENCE: 1
aatgatacgg cgaccaccga ga                    22

<210> SEQ ID NO 2
<211> LENGTH: 29
<212> TYPE: DNA
<213> ORGANISM: Artificial
<220> FEATURE:
<223> OTHER INFORMATION: Primer

<400> SEQUENCE: 2
aatgatacgg cgaccaccga gatctacac              29

<210> SEQ ID NO 3
<211> LENGTH: 37
<212> TYPE: DNA
<213> ORGANISM: Artificial

```
<220> FEATURE:
<223> OTHER INFORMATION: Index Tag
<220> FEATURE:
<221> NAME/KEY: Unsure
<222> LOCATION: (1)..(8)
<220> FEATURE:
<221> NAME/KEY: misc_feature
<222> LOCATION: (1)..(8)
<223> OTHER INFORMATION: n is a, c, g, or t

<400> SEQUENCE: 3
nnnnnnnngt gtagatctcg gtggtcgccg tatcatt                              37

<210> SEQ ID NO 4
<211> LENGTH: 8
<212> TYPE: DNA
<213> ORGANISM: Artificial
<220> FEATURE:
<223> OTHER INFORMATION: Index Tag

<400> SEQUENCE: 4 aggatagg                                                              8

<210> SEQ ID NO 5
<211> LENGTH: 8
<212> TYPE: DNA
<213> ORGANISM: Artificial
<220> FEATURE:
<223> OTHER INFORMATION: Index Tag

<400> SEQUENCE: 5 tcagagcc                                                              8

<210> SEQ ID NO 6
<211> LENGTH: 9
<212> TYPE: DNA
<213> ORGANISM: Artificial
<220> FEATURE:
<223> OTHER INFORMATION: Index Tag

<400> SEQUENCE: 6 catccggaa                                                             9

<210> SEQ ID NO 7
<211> LENGTH: 8
<212> TYPE: DNA
<213> ORGANISM: Artificial
<220> FEATURE:
<223> OTHER INFORMATION: Index Tag

<400> SEQUENCE: 7 ttatgagt                                                              8

<210> SEQ ID NO 8
<211> LENGTH: 8
<212> TYPE: DNA
<213> ORGANISM: Artificial
<220> FEATURE:
<223> OTHER INFORMATION: Index Tag

<400> SEQUENCE: 8 acgaataa                                                              8

<210> SEQ ID NO 9
<211> LENGTH: 8
<212> TYPE: DNA
<213> ORGANISM: Artificial
```

```
<220> FEATURE:
<223> OTHER INFORMATION: Index Tag

<400> SEQUENCE: 9 gatctgct                                                                    8

<210> SEQ ID NO 10
<211> LENGTH: 8
<212> TYPE: DNA
<213> ORGANISM: Artificial
<220> FEATURE:
<223> OTHER INFORMATION: Index Tag

<400> SEQUENCE: 10 aggctata                                                                    8

<210> SEQ ID NO 11
<211> LENGTH: 8
<212> TYPE: DNA
<213> ORGANISM: Artificial
<220> FEATURE:
<223> OTHER INFORMATION: Index Tag

<400> SEQUENCE: 11 gcctctat                                                                    8

<210> SEQ ID NO 12
<211> LENGTH: 8
<212> TYPE: DNA
<213> ORGANISM: Artificial
<220> FEATURE:
<223> OTHER INFORMATION: Index Tag

<400> SEQUENCE: 12 cttcgctt                                                                    8

<210> SEQ ID NO 13
<211> LENGTH: 33
<212> TYPE: DNA
<213> ORGANISM: Artificial
<220> FEATURE:
<223> OTHER INFORMATION: Primer

<400> SEQUENCE: 13
agatcggaag agcgtcgtgt agggaaagag tgt                                       33

<210> SEQ ID NO 14
<211> LENGTH: 22
<212> TYPE: DNA
<213> ORGANISM: Artificial
<220> FEATURE:
<223> OTHER INFORMATION: Primer

<400> SEQUENCE: 14
aatgatacgg cgaccaccga ga                                                   22

<210> SEQ ID NO 15
<211> LENGTH: 29
<212> TYPE: DNA
<213> ORGANISM: Artificial
<220> FEATURE:
<223> OTHER INFORMATION: Primer

<400> SEQUENCE: 15
aatgatacgg cgaccaccga gatctacac                                            29
```

```
<210> SEQ ID NO 16
<211> LENGTH: 29
<212> TYPE: DNA
<213> ORGANISM: Artificial
<220> FEATURE:
<223> OTHER INFORMATION: Primer

<400> SEQUENCE: 16
aatgatacgg cgaccaccga gatctacac                                29

<210> SEQ ID NO 17
<211> LENGTH: 29
<212> TYPE: DNA
<213> ORGANISM: Artificial
<220> FEATURE:
<223> OTHER INFORMATION: Primer

<400> SEQUENCE: 17
aatgatacgg cgaccaccga gatctacac                                29
```